United States Patent
Zhang et al.

(10) Patent No.: US 11,184,886 B2
(45) Date of Patent: *Nov. 23, 2021

(54) METHOD, BASE STATION, AND USER EQUIPMENT FOR IMPLEMENTING CARRIER AGGREGATION

(71) Applicant: Huawei Technologies Co., Ltd., Shenzhen (CN)

(72) Inventors: Hongping Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,161

(22) Filed: Jan. 31, 2018

(65) Prior Publication Data

US 2018/0160411 A1    Jun. 7, 2018

Related U.S. Application Data

(63) Continuation of application No. 14/288,086, filed on May 27, 2014, now Pat. No. 9,949,245, which is a
(Continued)

(30) Foreign Application Priority Data

Nov. 25, 2011  (CN) .......................... 201110380488.1

(51) Int. Cl.
*H04W 72/04*    (2009.01)
*H04L 5/00*     (2006.01)
(Continued)

(52) U.S. Cl.
CPC .......... *H04W 72/042* (2013.01); *H04L 5/001* (2013.01); *H04L 5/0032* (2013.01); *H04W 76/15* (2018.02);
(Continued)

(58) Field of Classification Search
CPC ... H04W 72/042; H04W 76/15; H04W 76/16; H04L 5/001; H04L 5/0032
See application file for complete search history.

(56) References Cited

U.S. PATENT DOCUMENTS 9,538,575 B2 *  1/2017  Yamada ................ H04W 76/22
2006/0178167 A1 *  8/2006  Tamura ................. H04B 7/022
                                                      455/560
(Continued)

FOREIGN PATENT DOCUMENTS

CN    102045862 A    5/2011
CN    102083205 A    6/2011
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.3.0, pp. 1-296, 3rd Generation Partnership Project, Valbonne, France (Sep. 2011).
(Continued)

*Primary Examiner* — Yemane Mesfin
*Assistant Examiner* — Henry Baron
(74) *Attorney, Agent, or Firm* — Leydig, Voit & Mayer, Ltd.

(57) ABSTRACT

Embodiments of the present invention provide a method, a base station, and a user equipment for implementing carrier aggregation. The method includes: determining, by a primary base station, to add a cell for a user equipment UE; and sending, by the primary base station, a first message to the UE, where the first message is used to instruct the UE to add the cell, the first message includes configuration information of the cell and an identifier or index of a base station to which the cell belongs, and the base station to which the cell belongs is a secondary base station. In the embodiments of
(Continued)

the present invention, under the control of the primary base station of the UE, a cell of another base station can be added for the UE, so as to implement carrier aggregation between base stations, thereby further increasing user throughput of the UE.

18 Claims, 10 Drawing Sheets

Related U.S. Application Data continuation of application No. PCT/CN2012/084811, filed on Nov. 19, 2012.

(51) Int. Cl.
*H04W 76/15* (2018.01)
*H04W 76/16* (2018.01)
*H04W 92/20* (2009.01)

(52) U.S. Cl.
CPC .......... *H04W 76/16* (2018.02); *H04L 5/0092* (2013.01); *H04W 92/20* (2013.01)

(56) References Cited

U.S. PATENT DOCUMENTS

| | | | |
|---|---|---|---|
| 2009/0156219 A1* | 6/2009 | Kim | H04W 36/26 455/442 |
| 2012/0263128 A1 | 10/2012 | Hu et al. | |
| 2012/0289220 A1 | 11/2012 | Yang et al. | |
| 2012/0322486 A1 | 12/2012 | Kameno et al. | |
| 2013/0004516 A1 | 1/2013 | Watanabe | |
| 2013/0010702 A1 | 1/2013 | Aminaka | |
| 2013/0039344 A1 | 2/2013 | Lee et al. | |
| 2013/0242726 A1 | 9/2013 | Zhu et al. | |
| 2014/0219248 A1 | 8/2014 | Reddiboyana et al. | |
| 2015/0055621 A1 | 2/2015 | Koskinen et al. | |

FOREIGN PATENT DOCUMENTS

| | | |
|---|---|---|
| CN | 102118804 A | 7/2011 |
| EP | 2493257 A1 | 8/2012 |
| EP | 2544496 A1 | 1/2013 |
| GB | 2472789 A | 2/2011 |
| WO | 2010105145 A1 | 9/2010 |
| WO | 2011047619 A1 | 4/2011 |
| WO | 2011108637 A1 | 9/2011 |
| WO | 2011125278 A1 | 10/2011 |
| WO | 2011129598 A2 | 10/2011 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.5.0., pp. 1-194, 3rd Generation Partnership Project, Valbonne, France (Sep. 2011).

"3rd Generation Partnership Project; Technical Specification Group Radio Access Network; Evolved Universal Terrestrial Radio Access Network (E-UTRAN); X2 application protocol (X2AP)(Release 10)," 3GPP TS 36.423 V10.3.0, pp. 1-132, 3rd Generation Partnership Project, Valbonne, France (Sep. 2011).

* cited by examiner

METHOD, BASE STATION, AND USER EQUIPMENT FOR IMPLEMENTING CARRIER AGGREGATION

CROSS-REFERENCE TO RELATED APPLICATIONS

This application is a continuation of U.S. patent application Ser. No. 14/288,086, filed on May 27, 2014, which a continuation of International Patent Application No. PCT/CN2012/084811, filed on Nov. 19, 2012, which claims priority to Chinese Patent Application No. 201110380488.1, filed on Nov. 25, 2011. All of the afore-mentioned patent applications are hereby incorporated by reference in their entireties.

TECHNICAL FIELD

Embodiments of the present invention relate to the field of communications technologies, and in particular, to a method, a base station, and a user equipment for implementing carrier aggregation.

BACKGROUND

With the development of mobile communications systems, the quality of service that can be provided by a system is increasingly higher. In order to maintain the long-term competitive edge of 3GPP, LTE-A (LTE-Advanced, a further evolution of LTE) standards are being set. In order to improve the spectral efficiency of the system and the throughput of a user equipment (User Equipment, UE), carrier aggregation (CA, Carrier Aggregation) is introduced to the LTE-A. The carrier aggregation refers to that the UE can use multiple component carriers (CC, Component Carrier) at the same time to perform uplink and downlink communications, so as to support high-speed data transmission.

The Release-10 version of the 3GPP supports cell (cell) aggregation (or carrier aggregation) in a base station, and adopts an underlying aggregation solution, that is, data of a service or a radio bearer (Radio Bearer, RB) may be delivered in multiple cells of the base station. Specifically, a scheduling program of the base station decides in real time in which cell a packet of data of a service is delivered, for example, a previous packet of data is delivered in one cell, and a next packet of data may be delivered in another cell.

However, the foregoing version does not yet support cell aggregation between base stations; as a result, the throughput of a user equipment cannot be further increased.

SUMMARY

Embodiments of the present invention provide a method, a base station, and a user equipment for implementing carrier aggregation, which can increase the throughput of the user equipment.

In one aspect, a method for implementing carrier aggregation is provided, which includes: determining, by a primary base station, to add a cell for a user equipment UE; and sending, by the primary base station, a first message to the UE, where the first message is used to instruct the UE to add the cell, the first message includes configuration information of the cell and an identifier or index of a base station to which the cell belongs, and the base station to which the cell belongs is a secondary base station.

In another aspect, a method for implementing carrier aggregation is provided, which includes: receiving, by a secondary base station, a second message from a primary base station, where the second message is used to request the secondary base station to add a cell of the secondary base station for a user equipment UE, and the second message includes an identifier of the cell of the secondary base station; and adding, by the secondary base station, the cell of the secondary base station for the UE according to the second message.

In another aspect, a method for implementing carrier aggregation is provided, which includes: receiving, by a user equipment UE, a first message from a primary base station, where the first message is used to instruct the UE to add a cell, the first message includes configuration information of the cell and an identifier or index of a base station to which the cell belongs, and the base station to which the cell belongs is a secondary base station; and adding, by the UE, the cell according to the first message.

In another aspect, a base station is provided, which includes: a determining module, configured to determine to add a cell for a user equipment UE; and a sending module, configured to send a first message to the UE, where the first message is used to instruct the UE to add the cell, the first message includes configuration information of the cell and an identifier or index of a base station to which the cell belongs, and the base station to which the cell belongs is a secondary base station.

In another aspect, a base station is provided, which includes: a receiving module, configured to receive a second message from a primary base station, where the second message is used to request the base station to add a cell of the base station for a user equipment UE, and the second message includes an identifier of the cell of the base station; and an addition module, configured to add the cell of the base station for the UE according to the second message.

In another aspect, a UE is provided, which includes: a receiving module, configured to receive a first message from a primary base station, where the first message is used to instruct the UE to add a cell, the first message includes configuration information of the cell and an identifier or index of a base station to which the cell belongs, and the base station to which the cell belongs is a secondary base station; and an addition module, configured to add a cell of the secondary base station according to the first message.

In another aspect, a communication system is provided, which includes the base station described above and the UE described above.

In the foregoing technical solutions, under the control of the primary base station of the UE, a cell of another base station can be added for the UE, so as to implement carrier aggregation between base stations, thereby further increasing the user throughput of the UE.

BRIEF DESCRIPTION OF DRAWINGS

To illustrate the technical solutions in the embodiments of the present invention more clearly, accompanying diagrams required for describing the embodiments or the prior art are introduced briefly in the following. Apparently, the accompanying diagrams in the following description merely show some embodiments of the present invention, and persons of ordinary skill in the art may further derive other drawings from these accompanying diagrams without creative efforts.

DESCRIPTION OF EMBODIMENTS

Figure 1:
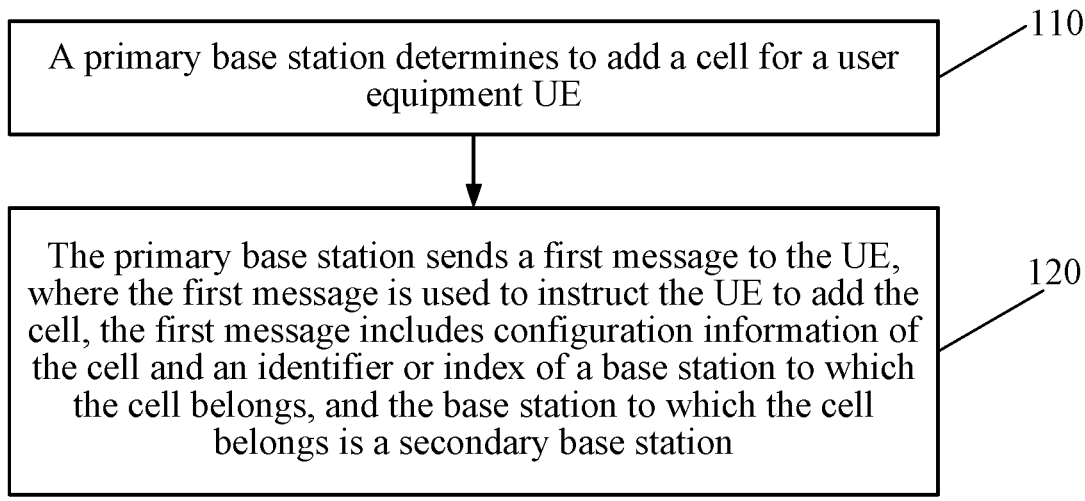
FIG. 1 is a schematic flowchart of a method for implementing carrier aggregation according to an embodiment of the present invention.

The following clearly and completely describes the technical solutions in the embodiments of the present invention with reference to the accompanying drawings in the embodiments of the present invention. Apparently, the described embodiments are merely a part of the embodiments of the present invention rather than all of the embodiments. All other embodiments obtained by persons of ordinary skill in the art based on the embodiments of the present invention without creative efforts shall fall within the protection scope of the present invention.

The technical solutions of the present invention can be applied in various communications systems, for example, a global system for mobile communications (GSM) system, a code division multiple access (CDMA, Code Division Multiple Access) system, wideband code division multiple access (WCDMA, Wideband Code Division Multiple Access), a general packet radio service (GPRS, General Packet Radio Service), long term evolution (LTE, Long Term Evolution), and an advanced long term evolution (LTE-A, Advanced Long Term Evolution) system.

A user equipment (UE, User Equipment) may be called a mobile terminal (Mobile Terminal), a mobile user equipment, and so on, and may communicate with one or more core networks through a radio access network (RAN, Radio Access Network). The user equipment may be a mobile terminal such as a mobile phone (or called a "cellular" phone) and a computer having a communication function, for example, may be a portable, a pocket-sized, a handheld, a computer built-in, or a vehicle-mounted mobile apparatus, which exchange language and/or data with the radio access network.

A base station may be a base transceiver station (BTS, Base Transceiver Station) in the GSM or CDMA, may also be a base station (NodeB) in the WCDMA, or may also be an evolved base station (eNB or e-NodeB, evolutional Node B) in the LTE, which is not limited in the present invention; however, for the convenience of description, the eNode B is taken as an example for illustration in the following embodiments.

According to an existing LTE technology, one cell of a base station corresponds to one carrier. According to the embodiments of the present invention, carrier aggregation means that a carrier corresponding to a cell of another base station is added for a UE accessing a base station as a component carrier for the carrier aggregation. According to the embodiments of the present invention, when the carrier aggregation is mentioned, adding a cell of another base station for the UE and/or adding a data radio bearer (DRB, Data Radio Bearer) of another base station for the UE may be involved.

It should be noted that, according to the embodiments of the present invention, cell aggregation between base stations may be classified into cell aggregation between macro base stations and cell aggregation between a macro base station and a micro base station (for example, a Pico base station), a home base station (HeNB), or other types of base stations in a heterogeneous network (Heterogeneous network). In the embodiments of the present invention, the cell aggregation between macro base stations is taken as an example for illustration.

According to the embodiments of the present invention, the concept of a primary base station is introduced, that is, in a solution of carrier aggregation between base stations, there is a primary base station, and other serving base stations of the UE are used as secondary base stations. The UE accesses through a primary cell (PCell) of a primary base station, and the primary base station decides whether to add a cell (that is, a secondary cell, SCell) of a secondary base station for the UE and control whether to set up a bearer on the secondary base station. For example, the primary base station may be a base station where the UE initiates initial access, and the change of the primary base station in the subsequent process requires an explicit instruction of a base station.

FIG. 1 is a schematic flowchart of a method for implementing carrier aggregation according to an embodiment of the present invention. The method in FIG. 1 is performed by a base station (for example, a primary base station for the carrier aggregation).

110: A primary base station determines to add a cell for a user equipment UE.

For example, the UE sets up an initial RRC (Radio Resource Control, radio resource control) connection in a cell of the primary base station, that is, the primary base station is a control base station of the UE. The primary base station determines, according to a preset policy (for example, according to a measurement report reported by the UE and a trigger condition), whether to add a cell of a secondary base station for the UE.

For example, after receiving an evolved radio access bearer (E-RAB, evolved Radio Access Bearer) setup request message from an MME (Mobility Management entity, mobility management entity), the primary base station may determine, according to the preset policy, whether to add the cell of the secondary base station for the UE; however, the embodiment of the present invention is not limited thereto, for example, after receiving the measurement report from the UE, the primary base station may also determine, according to the preset policy, whether to add the cell of the secondary base station for the UE.

120: The primary base station sends a first message to the UE, where the first message is used to instruct the UE to add the cell, the first message includes configuration information of the cell and an identifier or index of a base station to which the cell belongs, and the base station to which the cell belongs is a secondary base station.

For example, the first message may be called an RRC connection reconfiguration message. The foregoing configuration information of the cell of the secondary base station is used for the UE to configure the cell of the secondary base station, that is, add the cell of the secondary base station. The identifier or index of the base station may be included in a fixed location or preset cell of the RRC connection reconfiguration message, and used to indicate that the base station to which the cell belongs is a secondary base station, so that when the UE needs to transmit data through the secondary base station, the UE may select, according to correspondence between the identifier or index of the secondary base station in the RRC connection reconfiguration message and the cell of the secondary base station, to send the data through the cell of the secondary base station. The identifier of the base station may be a unique identifier, which is allocated by a network, of the base station in the network, and the index of the base station may be a number, which is allocated by the primary base station, of a serving base station of the UE, so that the UE can distinguish between different base stations. In comparison with using the identifier of the base station to distinguish between different base stations, using a short index to distinguish between different base stations can reduce a signaling overhead.

For example, the first message may have a message structure similar to that of a regular RRC connection reconfiguration message, and the difference lies in that the first message according to the embodiment of the present invention is further used to indicate a base station which the cell to be added belongs to. However, the embodiment of the present invention is not limited thereto, the foregoing first message may also be a new message specially used in the embodiment of the present invention. The foregoing cell may refer to at least one cell of the secondary base station.

In the embodiment of the present invention, under the control of the primary base station of the UE, the cell of the secondary base station can be added for the UE to implement carrier aggregation, so as to further increase the user throughput of the UE.

According to another embodiment of the present invention, the method in FIG. 1 further includes: before sending the first message to the UE, sending, by the primary base station, a second message to the secondary base station for requesting the secondary base station to add the cell for the UE, where the second message includes an identifier of the cell; and receiving, by the primary base station, a third message from the secondary base station for responding to the second message, where the third message includes configuration information of the cell.

For example, the second message may be called a secondary cell addition request (Scell Addition Request) message, and called a cell addition request message for short, or may be called an initial context setup request message. The third message may be called a secondary cell addition request response (Scell Addition Request ACK) message, and called a cell addition response message for short. For example, after determining to add a cell (or a carrier) of another base station for the UE, the primary base station sends a cell addition request message to the secondary base station through an X2/S1 interface, to request the secondary base station to add the cell of the secondary base station for the UE. The identifier of the cell of the secondary base station is used to indicate which cell of the secondary base station is added by the secondary base station for the UE. The identifier of the cell of the secondary base station may be information used to distinguish between different cells, such as a physical cell identifier (PCI, Physical Cell ID) of the cell. The cell addition response message is used to instruct whether the secondary base station allows adding the cell for the UE. If the secondary base station allows adding the cell for the UE, the cell addition response message may further include configuration information of the cell of the secondary base station, where the cell of the secondary base station is added for the UE.

For example, the foregoing RRC connection reconfiguration message may be included by the secondary base station in the foregoing cell addition request message, or may be generated by the primary base station according to the foregoing cell addition response message. For example, the primary base station generates an RRC connection reconfiguration message, and includes the configuration information of the cell to be added and an identifier or index of a base station to which the cell to be added belongs in the RRC connection reconfiguration message.

According to another embodiment of the present invention, in the method in FIG. 1, the second message is further used to request the secondary base station to add a data radio bearer DRB for the UE, and the second message further includes an identifier of the DRB and configuration information of an evolved radio access bearer E-RAB corresponding to the DRB.

For example, the cell addition request message further includes a DRB ID and a corresponding bearer parameter, so that the cell and the bearer can be added at the same time, so as to reduce the signaling overhead. However, the embodiment of the present invention is not limited thereto, the cell may be first added, and when a new service arrives, the DRB ID and the corresponding bearer parameter are carried by using a separate message.

According to the embodiment of the present invention, in step 120, the first message is further used to instruct the UE to add the DRB and associate the DRB to the secondary base station, and the first message further includes configuration information of the DRB, an identifier of the DRB, and an identifier or index of a base station to which the DRB is associated.

For example, the primary base station may instruct, through the RRC connection reconfiguration message, the UE to perform configuration according to the configuration information of the DRB and the identifier or index of the base station, so as to add the DRB on the secondary base station for the UE or add an DRB on another serving base station for the UE, and associate the DRB added for the UE to the secondary base station or set up the DRB between the UE and the secondary base station. In other words, associating the DRB to a base station refers to transferring related data of the DRB on the base station. The identifier or index of the base station may also be located at a fixed location or preset cell of the RRC connection reconfiguration message and used to indicate which base station (for example, the secondary base station) sets up the DRB with the UE, so that when the UE needs to transmit data of the foregoing DRB, the UE may select, according to correspondence between the identifier or index of the base station and the identifier of the DRB in the RRC connection reconfiguration message and correspondence between the identifier or index of the base station and the added cell, a cell of the base station to send the data.

Optionally, in another embodiment, the method in FIG. 1 further includes: sending, by the primary base station, a fifth message to the UE for instructing the UE to add the DRB and associate the DRB to the secondary base station, where the fifth message includes the configuration information of the DRB, the identifier of the DRB, and the identifier or index of the base station to which the DRB is associated.

For example, the fifth message may be called an RRC connection reconfiguration message. For specific description, reference may be made to the description of the first message, so the details are not described herein again.

According to another embodiment of the present invention, the method in FIG. 1 further includes: before sending the fifth message to the UE, sending, by the primary base station, a sixth message to the secondary base station for requesting the secondary base station to add the DRB for the UE, where the sixth message includes the identifier of the DRB and the configuration information of the E-RAB corresponding to the DRB; and receiving, by the primary base station, a seventh message from the secondary base station for responding to the sixth message, where the seventh message includes the configuration information of the DRB.

For example, the sixth message may be called a data radio bearer addition request message (DRB Addition Request), and called a bearer addition request message for short. The seventh message may be called a bearer addition response message. After determining that the DRB on the secondary base station needs to be added for the UE, the primary base station sends an independent bearer addition request message to the secondary base station through an X2/S1 interface. The bearer addition request message includes the identifier of the DRB that is allocated by the primary base station and a bearer parameter (for example, the configuration information of the E-RAB) corresponding to the identifier of the DRB. According to the embodiment of the present invention, the cell of the secondary base station may be first added, and when a new service arrives, the DRB is added and is associated to the secondary base station, so as to reduce a service delay.

According to another embodiment of the present invention, in step 120, the first message is further used to instruct the UE to change the DRB from being associated to one base station to being associated to another base station, and the first message includes the identifier of the DRB and an identifier or index of the another base station to which the DRB is associated.

For example, in a situation where the UE has set up a DRB on the primary base station or secondary base station, if the DRB needs to be set up on another base station according to a preset policy, the RRC connection reconfiguration message may include an ID of the DRB that has been set up and an identifier or index of a new base station, so that the UE can modify the configuration of the DRB and set up the DRB on the new base station. For example, when a new service arrives, a DRB corresponding to the new service may be immediately added and associated to the primary base station, so as to transmit data of the new service on the primary base station, which leads to a fast service connection and a low delay. Then, when learning, according to a measurement report reported by the UE, that the signal quality of the cell of the secondary base station is good, the primary base station adds the cell of the secondary base station and changes the DRB from being associated to the primary base station to being associated to the secondary base station. Optionally, the DRB may be further changed from being associated to a secondary base station to being associated to another secondary base station.

According to another embodiment of the present invention, in step 120, the first message is further used to instruct the UE and the secondary base station to set up a signaling radio bearer (SRB, Signaling Radio Bearer), and the third message and the first message both further include configuration information of the SRB.

For example, after it is determined that the cell of the secondary base station is to be added for the UE, an SRB on the cell may be set up, so that the secondary base station can directly perform signaling interaction with the UE, so as to reduce transferring of signaling. In addition, in this case, when the cell and/or the DRB of the secondary base station is added for the UE, the base station to which the added cell belongs or the index of the base station may be indicated and/or an identifier and/or index of a base station where the added DRB is located may be indicated (that is, the base station to which the DRB is associated is indicated). Optionally, the base station to which the DRB is associated may be not indicated, but by default, the base station to which the DRB is associated is a base station to which a cell delivering the RRC connection reconfiguration message belongs.

According to another embodiment of the present invention, the method in FIG. 1 further includes: receiving, by the primary base station, a fourth message from the secondary base station for learning that the cell is added successfully, where the fourth message includes an index of the cell of the secondary base station, and the index of the cell of the secondary base station is allocated by the primary base station and is included in the second message.

For example, the fourth message may be called a cell addition success message, or may be called a secondary cell addition notification (SCell Addition Notify) message for short. After RRC connection reconfiguration is completed, the UE may initiate a random access process on the cell of the secondary base station, so as to perform synchronization with the cell of the secondary base station. After the random access of the UE is completed, the secondary base station may send a cell addition success message to the primary base station through the X2/S1 interface, so as to notify that the cell is added successfully. In addition, the index of the cell of the secondary base station may be allocated by the primary base station, and which cell is added successfully is determined through a short cell index, so as to reduce the signaling overhead. The index of the cell of the secondary base station may be allocated by the primary base station, for example, the cell of the secondary base station may be numbered by the primary base station.

Optionally, in another embodiment, the method in FIG. 1 further includes: sending, by the primary base station, an identifier of the E-RAB and path information of the secondary base station to a mobility management entity, to request the mobility management entity to instruct a serving gateway to send data of the E-RAB to the secondary base station;

or, forwarding, by the primary base station, the data, received from the serving gateway, of the E-RAB to the secondary base station.

For example, there may be two transmission solutions for sending service data to the UE through the secondary base station. The first one is that, the serving gateway first sends the service data to the primary base station, then, the primary base station forwards the service data to the secondary base station, and finally, the secondary base station sends the service data to the UE. The other one is that, the identifier of the E-RAB and a path of the secondary base station are carried through an independent path switch request (PATH SWITCH REQUEST) message, for indicating that service data of the E-RAB is switched to an eNB2, and then, the serving gateway directly sends the service data to the secondary base station, so as to reduce transferring of the service data. Optionally, the foregoing identifier of the E-RAB and the path of the secondary base station may be carried in an E-RAB setup response (E-RAB SETUP RESPONSE) message.

Optionally, in another embodiment, after the RRC connection reconfiguration is completed, the primary base station may receive an RRC connection reconfiguration completion message from the UE.

According to the embodiment of the present invention, cell aggregation between macro base stations can increase the data throughput of a user equipment at an edge of a base station and improve the user experience. In addition, when the embodiment of the present invention is applied in a heterogeneous network, cell aggregation between a macro base station and a micro base station or an HeNB not only can increase the data throughput of a user equipment but also can distribute the system load of a macro network, and can reduce the occurrence of switchover in comparison with a pure HeNB network.

Figure 2:
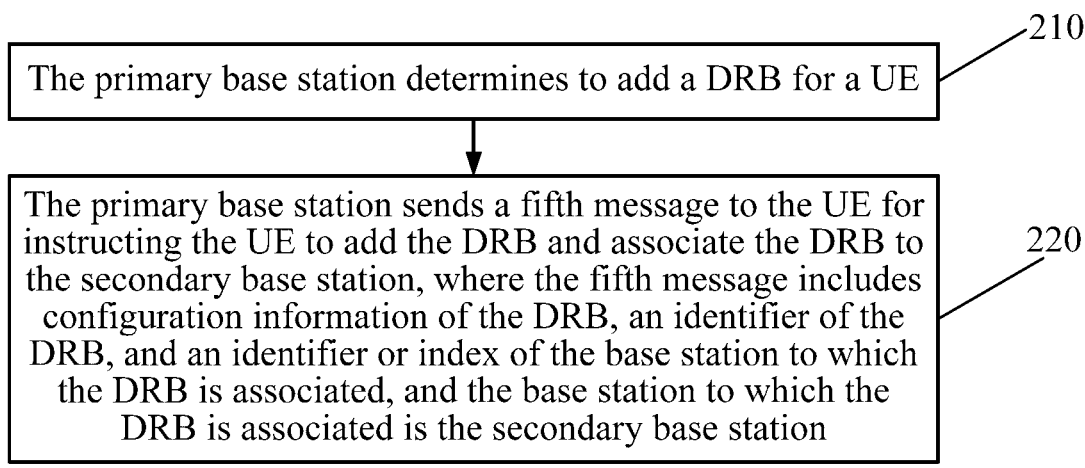
FIG. 2 is a schematic flowchart of a method for implementing carrier aggregation according to another embodiment of the present invention.

FIG. 2 is a schematic flowchart of a method for implementing carrier aggregation according to another embodiment of the present invention. The method in FIG. 2 is performed by a base station (for example, a primary base station for the carrier aggregation).

210: The primary base station determines to add a DRB for a UE.

For example, the UE sets up an initial RRC connection in a cell of the primary base station, that is, the primary base station is used as a control base station of the UE. The primary base station determines, according to a preset policy (for example, according to a measurement report reported by the UE and a trigger condition), whether to add a DRB on a secondary base station for the UE. After receiving an E-RAB setup request from an MME, the primary base station determines, according to the preset policy, whether to add the DRB on the secondary base station for the UE; however, the embodiment of the present invention is not limited thereto, for example, the primary base station may also determine, according to the preset policy, whether to add the DRB on the secondary base station for the UE after the cell is added or after the measurement report is received from the UE.

220: The primary base station sends a fifth message to the UE for instructing the UE to add the DRB and associate the DRB to the secondary base station, where the fifth message includes configuration information of the DRB, an identifier of the DRB, and an identifier or index of the base station to which the DRB is associated, and the base station to which the DRB is associated is the secondary base station.

For example, the fifth message may be called an RRC connection reconfiguration message. The foregoing configuration information of the DRB is used by the UE to configure the foregoing DRB, so as to add the foregoing DRB. The identifier or index of the base station may be located at a fixed location or preset cell of the RRC connection reconfiguration message and used to indicate which base station (for example, the secondary base station) sets up the DRB with the UE, so that when the UE needs to transmit data of the foregoing DRB, the UE may select, according to correspondence between the identifier of the DRB and the foregoing identifier or index of the base station in the RRC connection reconfiguration message and correspondence between the identifier or index of the base station and the added cell, to send the data through a cell of the base station (for example, an added cell of the secondary base station). For example, the fifth message may have a message structure similar to that of a regular RRC connection reconfiguration message, and the difference lies in that the fifth message according to the embodiment of the present invention is further used to indicate which base station the cell to be added belongs to. However, the embodiment of the present invention is not limited thereto, the foregoing RRC connection reconfiguration message may also be a new message specially used in the embodiment of the present invention. The foregoing DRB may refer to at least one DRB.

In the embodiment of the present invention, under the control of the primary base station of the UE, a DRB on another base station can be added for the UE, so as to implement the carrier aggregation, thereby further increasing the user throughput of the UE. In addition, according to the embodiment of the present invention, the process of adding the DRB may be independent from the process of adding the cell, so that the cell may be first added, and the DRB is added after a new service arrives, so as to reduce a service delay.

In step 220, before sending the fifth message to the UE, the primary base station sends a sixth message to the secondary base station for requesting the secondary base station to add the DRB for the UE, where the sixth message includes the identifier of the DRB and configuration information of an E-RAB corresponding to the DRB; and the primary base station receives a seventh message from the secondary base station for responding to the sixth message, where the seventh message includes the configuration information of the DRB.

For example, the sixth message may be called a bearer addition request message. The seventh message may be called a bearer addition response message. For example, after determining that the DRB on the secondary base station needs to be added for the UE, the primary base station may send a bearer addition request message to the secondary base station through an X2/S1 interface. The bearer addition request message includes a DRB ID allocated by the primary base station and a bearer parameter (for example, the configuration information of the E-RAB) corresponding to the DRB ID.

Optionally, in another embodiment, the method in FIG. 2 further includes: sending, by the primary base station, an identifier of the E-RAB and path information of the secondary base station, to an MME, so as to request the MME to instruct a serving gateway to send data of the E-RAB to the secondary base station; or, forwarding, by the primary base station, the data, received from the serving gateway, of the E-RAB to the secondary base station.

For example, there may be two transmission solutions for sending service data to the UE through the secondary base station. The first one is that, the serving gateway first sends the service data to the primary base station, then, the primary base station forwards the service data to the secondary base station, and finally, the secondary base station sends the service data to the UE. The other one is that, the identifier of the E-RAB and a path of the secondary base station are carried through an independent path switch request message, for indicating that a service data stream of the E-RAB is switched to an eNB2, and then, the serving gateway directly sends the service data to the secondary base station, so as to reduce transferring of the service data. Optionally, the identifier of the E-RAB and the path of the secondary base station may be carried in an E-RAB setup response message.

Figure 3:
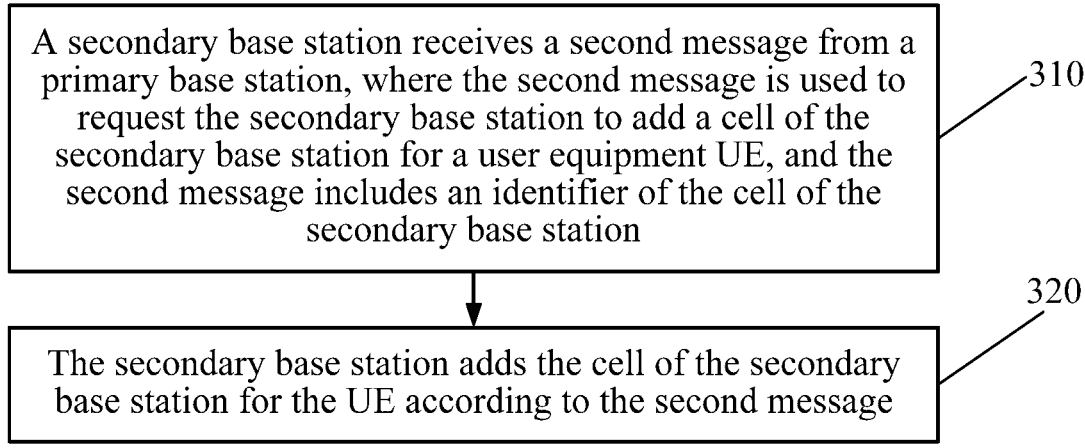
FIG. 3 is a schematic flowchart of a method for implementing carrier aggregation according to another embodiment of the present invention.

FIG. 3 is a schematic flowchart of a method for implementing carrier aggregation according to another embodiment of the present invention. The method in FIG. 3 is performed by a base station (for example, a secondary base station for the carrier aggregation). The method in FIG. 3 corresponds to the method in FIG. 1, so the details are not described herein again.

310: A secondary base station receives a second message from a primary base station, where the second message is used to request the secondary base station to add a cell of the secondary base station for a user equipment UE, and the second message includes an identifier of the cell of the secondary base station.

320: The secondary base station adds the cell of the secondary base station for the UE according to the second message.

For example, the second message may be called a cell addition request message. For example, the secondary base station performs admission control according to the identifier of the cell of the secondary base station that is included in the cell addition request message, so as to determine whether to add the cell of the secondary base station for the UE.

In the embodiment of the present invention, under the control of the primary base station of the UE, a cell of another base station can be added for the UE, so as to implement the carrier aggregation, thereby further increasing the user throughput of the UE.

Optionally, in another embodiment, the method in FIG. 3 further includes: sending, by the secondary base station, a third message to the primary base station for responding to the second message, where the third message includes configuration information of the cell of the secondary base station. For example, the third message may be called a cell addition response message.

Optionally, in another embodiment, in step 320, the second message is further used to request the secondary base station to add a data radio bearer DRB for the UE, and the second message further includes an identifier of the DRB and configuration information of an evolved radio access bearer E-RAB corresponding to the DRB. The method in FIG. 3 further includes: adding, by the secondary base station, the DRB for the UE according to the second message.

For example, the secondary base station performs configuration according to the identifier of the DRB and the configuration information of the E-RAB that are included in the cell addition request message, so as to add the DRB for the UE.

Optionally, in another embodiment, in step 320, the third message further includes configuration information of a signaling radio bearer SRB.

Optionally, in another embodiment, the method in FIG. 3 further includes: sending, by the secondary base station, a fourth message to the primary base station for notifying the primary base station that the cell is added successfully, where the fourth message includes an index of the cell of the secondary base station, and the index of the cell of the secondary base station is allocated by the primary base station and included in the fourth message, for example, the fourth message may be called a cell addition success message.

Figure 4:
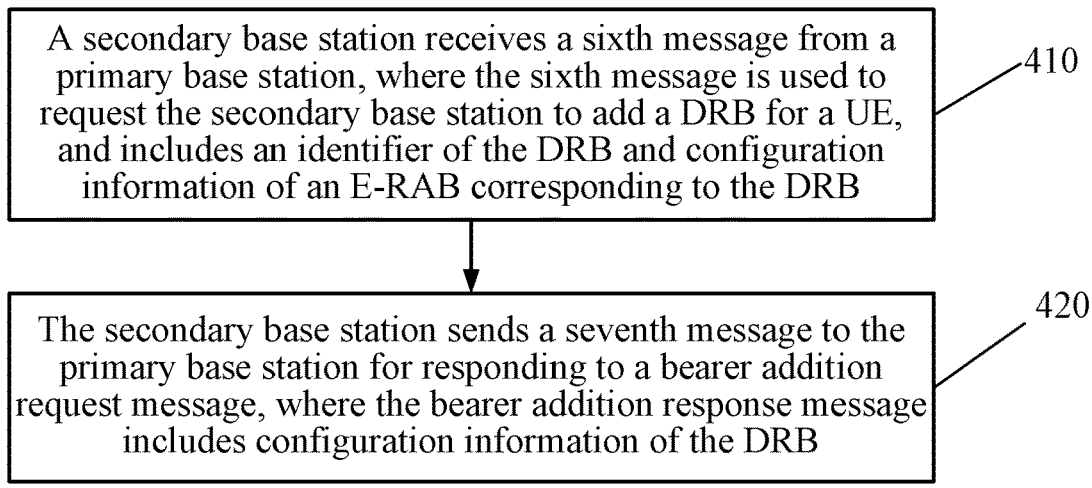
FIG. 4 is a schematic flowchart of a method for implementing carrier aggregation according to another embodiment of the present invention.

FIG. 4 is a schematic flowchart of a method for implementing carrier aggregation according to another embodiment of the present invention. The method in FIG. 4 is performed by a base station (for example, a secondary base station for the carrier aggregation). The method in FIG. 4 corresponds to the method in FIG. 2, so the details are not described herein again.

410: A secondary base station receives a sixth message from a primary base station, where the sixth message is used to request the secondary base station to add a DRB for a UE and includes an identifier of the DRB and configuration information of an E-RAB corresponding to the DRB.

420: The secondary base station sends a seventh message to the primary base station for responding to a bearer addition request message, where the bearer addition response message includes configuration information of the DRB. For example, the sixth message may be called a bearer addition request message, and the seventh message may be called a bearer addition response message.

In the embodiment of the present invention, under the control of the primary base station of the UE, a cell of another base station can be added for the UE, so as to implement the carrier aggregation, thereby further increasing the user throughput of the UE.

Figure 5:
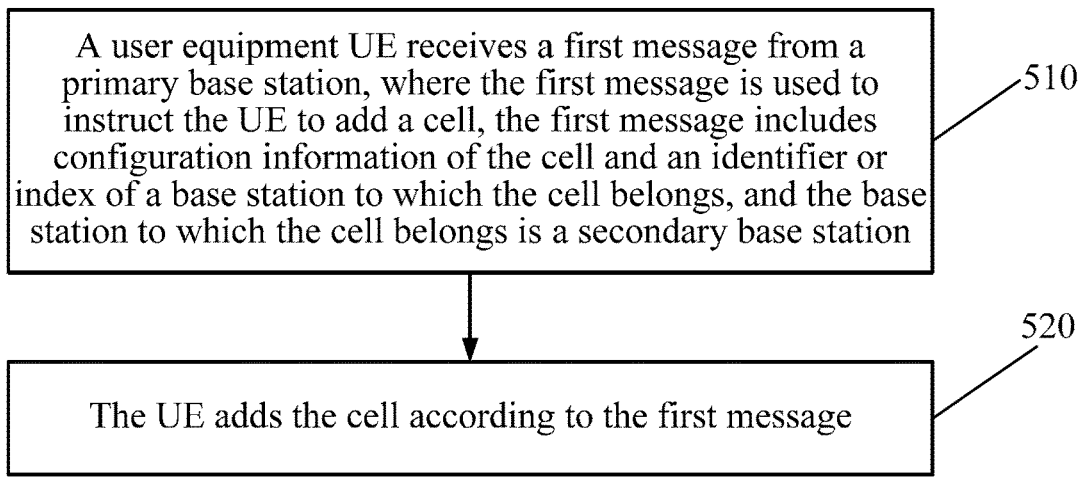
FIG. 5 is a schematic flowchart of a method for implementing carrier aggregation according to another embodiment of the present invention.

FIG. 5 is a schematic flowchart of a method for implementing carrier aggregation according to another embodiment of the present invention. The method in FIG. 5 is performed by a UE. The method in FIG. 5 corresponds to the method in FIG. 1, so the details are not described herein again.

510: A user equipment UE receives a first message from a primary base station, where the first message is used to instruct the UE to add a cell, the first message includes configuration information of the cell and an identifier or index of a base station to which the cell belongs, and the base station to which the cell belongs is a secondary base station.

520: The UE adds the cell according to the first message.

For example, the first message may be called an RRC connection reconfiguration message. The UE performs configuration according to configuration information of a cell of the secondary base station and an identifier or index of a base station to which the cell to be added belongs that are included in the RRC connection reconfiguration message, so as to add the cell of the secondary base station. When the UE needs to send data through the secondary base station, the UE may send the data through the cell of the secondary base station according to correspondence between the identifier or index of the base station to which the cell to be added belongs in the RRC connection reconfiguration message and the cell of the secondary base station.

Optionally, in another embodiment, in step 510, the first message is further used to instruct the UE to add a data radio bearer DRB and associate the DRB to the secondary base station, and the first message further includes an identifier of the DRB, configuration information of the DRB, and the identifier or index of the base station to which the DRB is associated. The method in FIG. 5 further includes: adding, by the UE according to the first message, the DRB and associating the DRB to the secondary base station.

For example, when the UE needs to send data of the DRB, the UE may determine, according to correspondence between the identifier or index of the secondary base station in the RRC connection reconfiguration message and the cell of the secondary base station and correspondence between the identifier or index of the secondary base station and the identifier of the DRB, to send the data through the cell of the secondary base station. The identifier or index of the secondary base station and an identifier or index of a base station to which the cell to be added belongs may be located in the same location or cell of the RRC connection reconfiguration message, or may be located in different locations or cells of the RRC connection reconfiguration message.

Optionally, in another embodiment, the method in FIG. 5 further includes: receiving, by the UE, a fifth message from the primary base station, where the fifth message is used to instruct the UE to add the DRB and associate the DRB to the secondary base station, and the fifth message includes the configuration information of the DRB, the identifier of the DRB, and an identifier or index of a secondary base station setting up the DRB with the UE. The UE adds the DRB and associates the DRB to the secondary base station according to the fifth message. For example, the fifth message may be called an RRC connection reconfiguration message.

Optionally, in another embodiment, in step 510, the first message is further used to instruct the UE to change the DRB from being associated to one base station to being associated to another base station, and the first message includes the identifier of the DRB and an identifier or index of the another base station to which the DRB is associated. The method in FIG. 5 further includes: changing the DRB from being associated to one base station to being associated to another base station.

Optionally, in another embodiment, in step 510, the first message is further used to instruct the UE to set up a signaling radio bearer SRB with the secondary base station, and the first message further includes configuration information of the SRB. The method in FIG. 5 further includes: setting up, by the UE, the SRB with the secondary base station according to the first message.

In the embodiment of the present invention, under the control of the primary base station of the UE, a cell of another base station can be added for the UE, so as to implement the carrier aggregation, thereby further increasing the user throughput of the UE.

Figure 6:
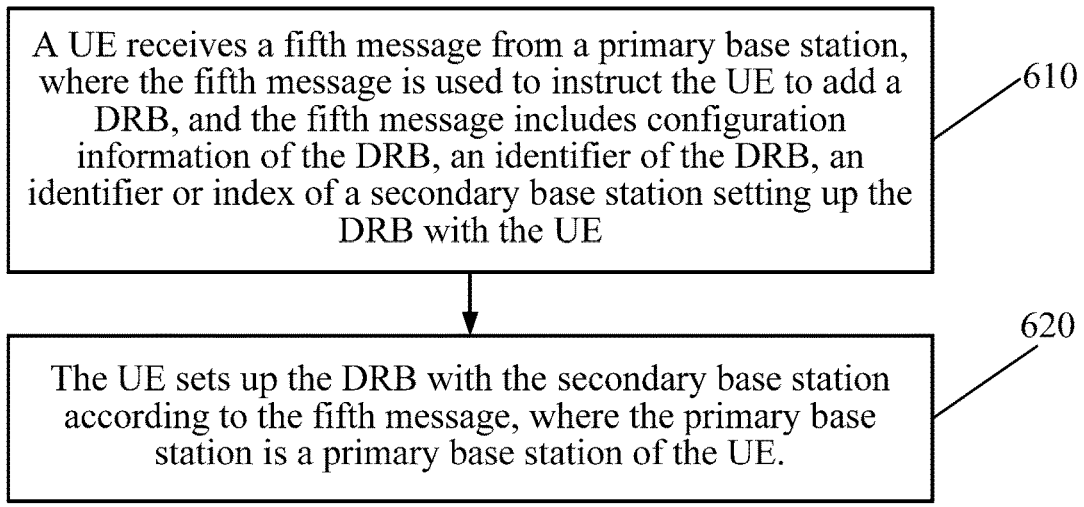
FIG. 6 is a schematic flowchart of a method for implementing carrier aggregation according to another embodiment of the present invention.

FIG. 6 is a schematic flowchart of a method for implementing carrier aggregation according to another embodiment of the present invention. The method in FIG. 6 is performed by a UE. The method in FIG. 6 corresponds to the method in FIG. 2, so the details are not described herein again.

610: A UE receives a fifth message from a primary base station, where the fifth message is used to instruct the UE to add a DRB and associate the DRB to a secondary base station, and the fifth message includes configuration information of the DRB, an identifier of the DRB, an identifier or index of a secondary base station setting up the DRB with the UE.

620: The UE adds the DRB and associates the DRB to the secondary base station according to the fifth message. For example, the fifth message may be called an RRC connection reconfiguration message.

In the embodiment of the present invention, under the control of the primary base station of the UE, a cell of another base station can be added for the UE, so as to implement the carrier aggregation, thereby further increasing the user throughput of the UE.

Optionally, in another embodiment, the method in FIG. 6 further includes: receiving, by the UE, data of the DRB from the secondary base station; or sending, by the UE, data of the DRB to the secondary base station.

The embodiment of the present invention is described in detail in the following with reference to specific examples. It should be noted that, in the following embodiment of the present invention, cell aggregation between macro base stations is taken as an example for illustration, for example, a primary base station (for example, an eNB1) of a UE is a primary base station for carrier aggregation between base stations, another serving base station (for example, an eNB2) of the UE is a secondary base station. However, the embodiment of the present invention is not limited thereto, for example, the primary base station for the carrier aggregation may be a macro base station, and the secondary base station may be a micro base station (for example, a Pico base station) or a home base station (HeNB). The present invention is not limited to specific standards represented by the foregoing terms but may be similarly applied in a base station of another form.

Figure 7:
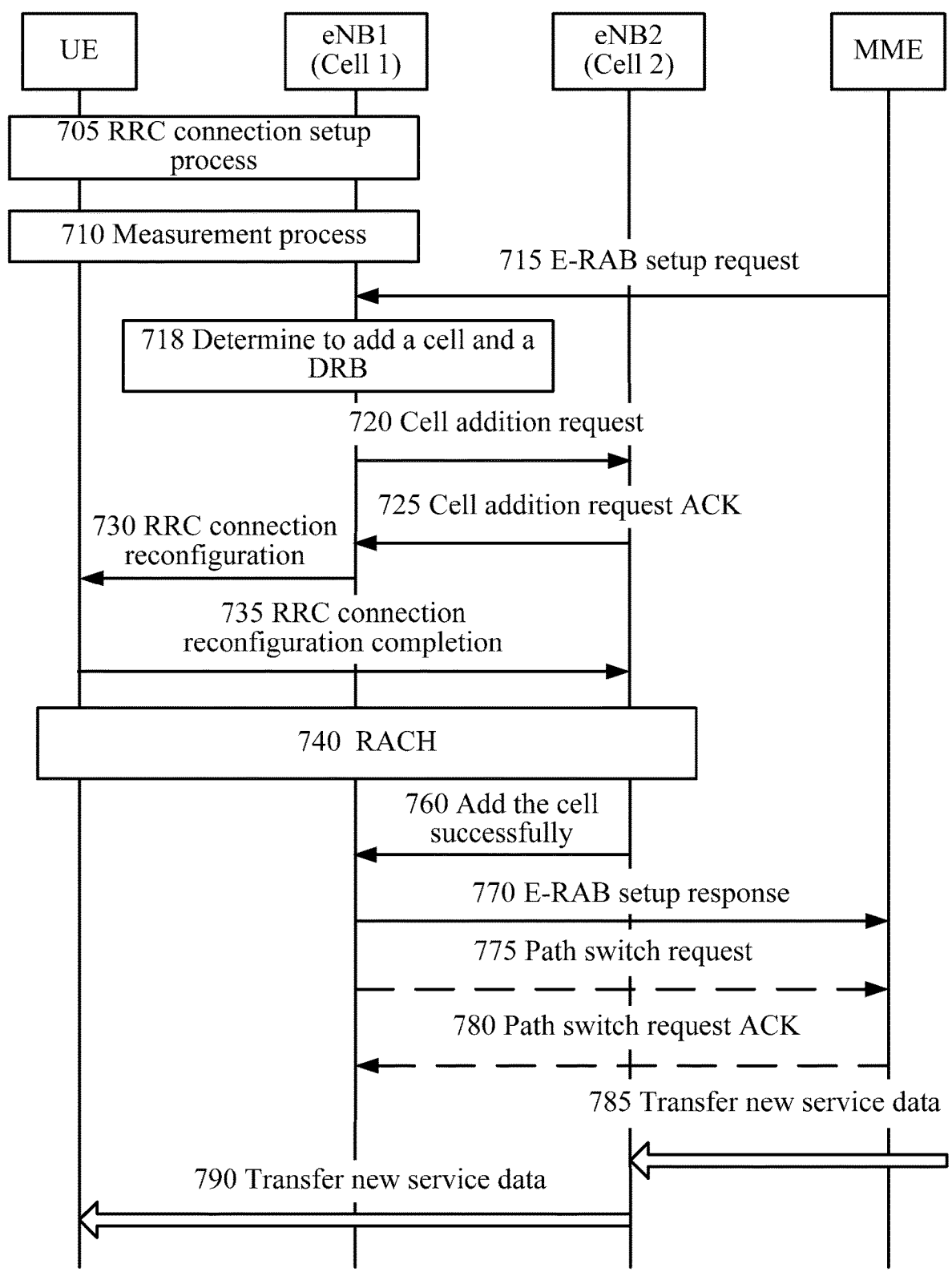
FIG. 7 is a schematic flowchart of a process of implementing carrier aggregation according to an embodiment of the present invention.

FIG. 7 is a schematic flowchart of a process of implementing carrier aggregation according to an embodiment of the present invention.

705: A UE sets up an initial RRC connection with a cell 1 (Cell1) of an eNB1.

710: The UE performs measurement according to a measurement control message delivered by the eNB1, so as to obtain a measurement result such as signal quality information of a neighboring cell (for example, an eNB2) of the eNB1 and report it to the eNB1.

715: When a new service arrives, an MME sends an S1 message, that is, an E-RAB setup request (E-RAB SETUP REQUEST) to the eNB1 through an S1 interface for requesting setting up a new E-RAB.

718: After receiving the E-RAB setup request, the eNB1 determines, according to a preset policy, that a cell 2 (Cell2) of the eNB2 needs to be added for the UE and a bearer (DRB) corresponding to the E-RAB needs to be set up on the eNB2. Optionally, the eNB1 may allocate a cell index (cell index) of the Cell2 and an identifier (DRB ID) of the DRB corresponding to the E-RAB. The DRB ID or the cell index is uniformly allocated by the eNB1, thereby avoiding that the DRB ID or the cell index incurs a collision at the UE side. For example, if each of the eNB1 and eNB2 allocates a DRB ID when setting up a corresponding DRB, the same DRB ID may be allocated to different DRBs, resulting in that two DRBs having the same ID exist at a UE side. The foregoing preset policy may be that the signal quality of a neighboring cell meets a preset threshold and/or a cell of a primary base station fails to meet the data throughput requirement of the UE. For example, the eNB1 may learn, through the measurement result reported by the UE, whether the signal quality of the Cell2 of the eNB2 meets the preset threshold.

720: The eNB1 sends a cell addition request (Scell Addition Request) message to the eNB2. The cell addition request message may be called an initial context setup request message and is similar to an initial context setup request message sent between a mobility management entity and an eNB. The cell addition request message may carry a cell index of the Cell2 and corresponding cell information (including a frequency and a PCI of a cell), for adding the cell. The cell addition request message may further carry the DRB ID and a corresponding E-RAB related parameter (mainly including a QoS (Quality of Service) parameter such as a priority and a guaranteed rate), for adding a DRB.

725: After receiving the cell addition request message, the eNB2 may perform admission control according to the foregoing information carried in the cell addition request message, so as to determine whether to add a cell of the eNB2 for the UE; then, the eNB2 may send a cell addition response (Scell Addition Request ACK) message to the eNB1. The cell addition response message includes configuration information related to cell addition, for example, configuration information such as a frequency band and a PCI of the Cell2, antenna information of the Cell2, and a physical channel, and further includes configuration information related to DRB addition, for example, PDCP (packet data convergence protocol, Packet Data Convergence Protocol) configuration information, RLC (Radio Link Control, radio link control) configuration information, and logical channel configuration information of the DRB. Optionally, the cell addition response message may include an RRC connection reconfiguration (RRC Connection Reconfiguration) message, where the RRC connection reconfiguration message includes the configuration information related to cell addition, and indicates a base station to which an added cell belongs, for example, an identifier or index of the base station to which the added cell belongs is included in a fixed location or preset cell of the RRC connection reconfiguration message. The RRC connection reconfiguration message further includes the configuration information related to DRB addition and indicates a base station (eNB2) associated to the DRB, that is, a base station setting up the DRB with the UE, for example, an identifier or index of the base station setting up the DRB with the UE is included in a fixed location or preset cell of the RRC connection reconfiguration message. Optionally, when the base station setting up the DRB with the UE and the base station to which the added cell belongs are the same, the identifier or index of the base station setting up the DRB with the UE and the identifier or index of the base station to which the added cell belongs may be located in the same location or cell in the RRC connection reconfiguration message.

730: After receiving the cell addition response message from the eNB2, the eNB1 generates an RRC connection reconfiguration message, and sends it to the UE. The RRC connection reconfiguration message includes the configuration information related to cell addition, and indicates a base station to which the added cell belongs; and includes the configuration information related to DRB addition, and indicates a base station (eNB2) associated to the DRB. Optionally, in a situation where the cell addition response message includes the RRC connection reconfiguration message, the RRC connection reconfiguration message included in the cell addition response message may be directly sent to the UE.

735: After receiving the RRC connection reconfiguration message, the UE performs configuration according to the related configuration information included in the RRC connection reconfiguration message, so as to add the cell of the eNB2 and associate the DRB to the eNB2, that is, set up the DRB with the eNB2; then, the UE sends an RRC connection reconfiguration completion (RRC Connection Reconfiguration Complete) message to the eNB1.

740: The UE initiates a random access process on the new cell Cell2, so as to perform synchronization with the Cell2. Optionally, the sequence of steps 735 and 740 may be reversed.

760: After the random access of the UE succeeds, the eNB2 sends a cell addition success (SCELL ADDITION NOTIFY) message to the eNB1 for notifying the eNB1 that the cell is added successfully. Optionally, the cell addition success message may carry the index of the Cell2 for indicating that the Cell2 of the eNB2 is added successfully.

770: After receiving the cell addition success message, the eNB1 sends an E-RAB setup response (E-RAB SETUP RESPONSE) message to the MME, so as to notify the MME that an E-RAB is set up successfully.

Optionally, the E-RAB setup response message may carry an identifier of the E-RAB and a path of the eNB2, for example, a transport layer address and GTP (General Packet Radio Service Tunnel Protocol, general packet radio service tunnel protocol)-TEID (Tunnel Endpoint ID, tunnel endpoint identifier), for indicating that service data of the E-RAB is switched to the eNB2, that is, requesting the MME to instruct a serving gateway (serving-Gateway) (not shown) to send a data stream of the E-RAB to the eNB2. In this case, after step 770, steps 785 and 790 are performed.

Optionally, if the identifier of the E-RAB and the path of the eNB2 are carried through an independent message, steps 775 to 790 may be performed after step 770.

775: The eNB1 sends an independent path switch request (PATH SWITCH REQUEST) message to the MME, for indicating that the service data of the E-RAB is switched to the eNB2, where the message may carry the identifier of the E-RAB and the path of the eNB2.

780: The eNB2 sends a path switch request response (ACK, Acknowledgement) message to the eNB1 for responding to the path switch request.

785: After receiving a request for switching the service data of the E-RAB to the eNB2, the serving gateway directly sends the data to the eNB2.

790: The eNB2 forwards, to the UE, new service data received from the serving gateway.

Optionally, for the service data that needs to be sent to the UE by the eNB2, the service data may also be first sent by the serving gateway to the eNB1 and then forwarded by the eNB1 to the eNB2.

In the embodiment in FIG. 7, when a new service arrives, a primary base station of the UE determines to add a cell of a secondary base station for the UE, and at the same time, adds a DRB corresponding to the new service, and allocates the DRB to the secondary base station, so as to reduce signaling interaction, thereby reducing a signaling overhead.

Figure 8:
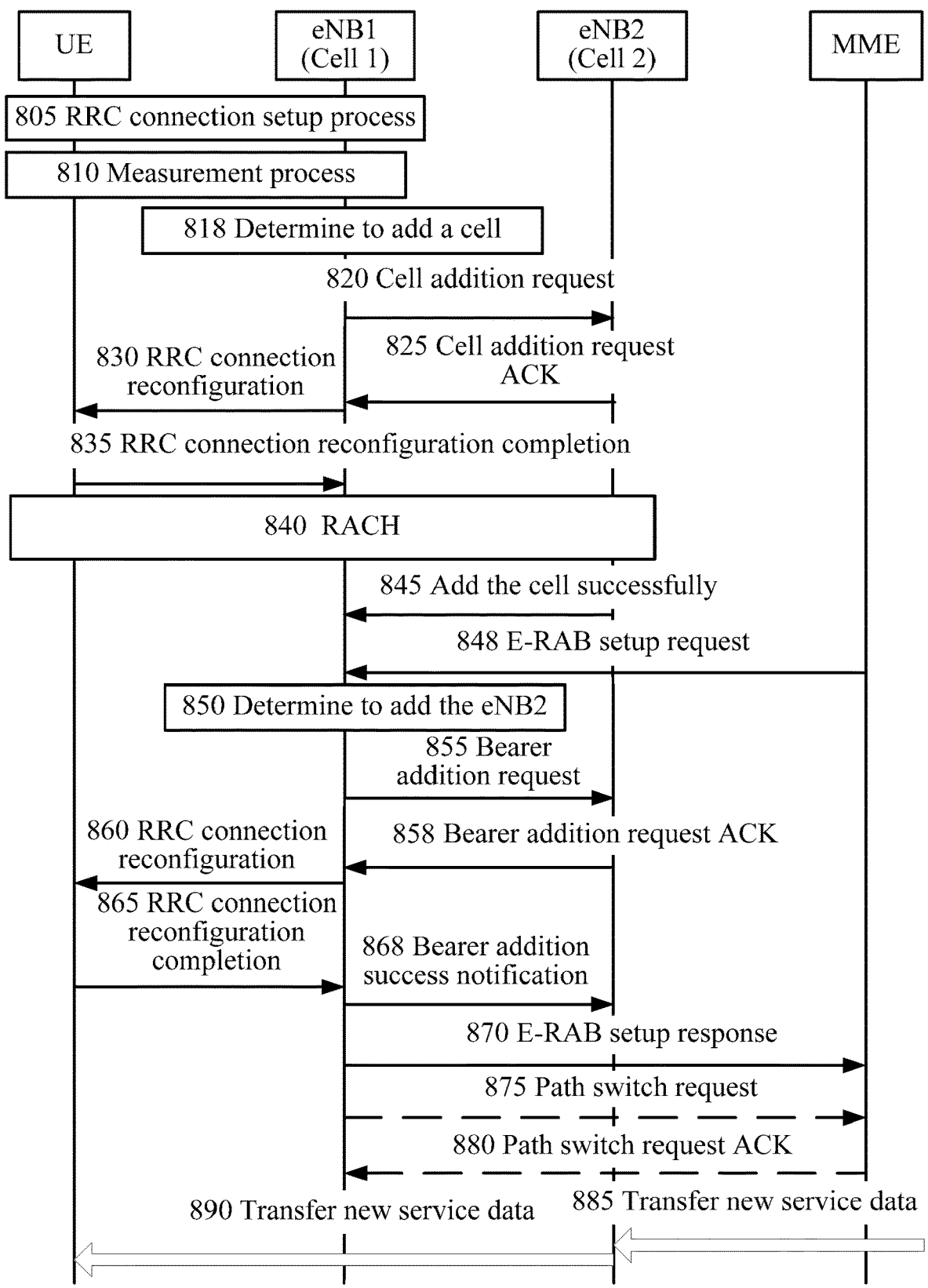
FIG. 8 is a schematic flowchart of a process of implementing carrier aggregation according to another embodiment of the present invention.

FIG. 8 is a schematic flowchart of a process of implementing carrier aggregation according to another embodiment of the present invention.

805: A UE sets up an initial RRC connection with a Cell1 of an eNB1.

810: The UE performs measurement according to a measurement control message delivered by the eNB1, so as to obtain a measurement result such as signal quality information of a neighboring cell (for example, an eNB2) of the eNB1.

818: The eNB1 decides to add a Cell2 of the eNB2 for the UE according to a preset policy. Optionally, the eNB1 may allocate a cell index to the Cell2. The preset policy in step 818 is similar to the preset policy in step 718 in FIG. 7, so the details are not described herein again.

820: The eNB1 sends a cell addition request message to the eNB2. The cell addition request message may be called an initial context setup request message and is similar to an initial context setup request message sent between a mobility management entity and an eNB. The cell addition request message may carry cell information (including a frequency band and a PCI of a cell) for adding the cell. Optionally, the cell addition request message may further carry the cell index of the Cell2.

825: After receiving the cell addition request message, the eNB2 may perform admission control according to the foregoing information carried in the cell addition request message, so as to determine whether to add a cell of the eNB2 for the UE; then, the eNB2 may send a cell addition response message to the eNB1. The cell addition response message includes configuration information related to cell addition, for example, configuration information such as a frequency band and a PCI of the Cell2, antenna information of the Cell2, and a physical channel. Optionally, the cell addition response message may include an RRC connection reconfiguration message, where the RRC connection reconfiguration message includes the configuration information related to cell addition, and indicates a base station to which an added cell belongs, for example, an ID or index of the base station to which the added cell belongs may be included in a fixed location or preset cell of the RRC connection reconfiguration message.

830: After receiving the cell addition response message from the eNB2, the eNB1 generates an RRC connection reconfiguration message, and sends it to the UE. The RRC connection reconfiguration message includes the configuration information related to cell addition, and indicates the base station to which the added cell belongs. Optionally, in a situation where the cell addition response message includes the RRC connection reconfiguration message, the RRC connection reconfiguration message included in the cell addition response message may be directly sent to the UE.

835: After receiving the RRC connection reconfiguration message, the UE performs configuration according to the related configuration information included in the RRC connection reconfiguration message, so as to add the cell of the eNB2; then, the UE may send an RRC connection reconfiguration completion message to the eNB1.

840: The UE initiates a random access process on the new cell Cell2, so as to perform synchronization with the Cell2. Optionally, the sequence of steps 835 and 840 may be reversed.

845: After the random access of the UE succeeds, the eNB2 sends a cell addition success message to the eNB1 for notifying the eNB1 that the Cell2 is added successfully. Optionally, the cell addition success message may carry the index of the Cell2, for indicating that the Cell2 of the eNB2 is added successfully.

848: When a new service arrives, an MME sends an S1 message, that is, an E-RAB setup request, to the eNB1 through an S1 interface, for requesting setting up a new E-RAB.

850: After receiving the E-RAB setup request, the eNB1 determines, according to a preset policy, that a bearer corresponding to the E-RAB needs to be set up on the eNB2. Optionally, the eNB1 may allocate a DRB ID corresponding to the E-RAB. The foregoing preset policy may be that the signal quality of a neighboring cell meets a preset threshold and/or the data throughput of the UE fails to meet a requirement.

855: The eNB1 sends a bearer addition request message (DRB ADDITION Request) to the eNB2, where the bearer addition request message may carry the DRB ID and a corresponding E-RAB related parameter (mainly including a QoS parameter such as a priority and a guaranteed rate), for adding a DRB.

858: After receiving the bearer addition request message, the eNB2 may perform admission control according to the foregoing information carried in the bearer addition request message, so as to determine whether to add the DRB for the UE on the eNB2. The eNB2 may send a bearer addition response (DRB ADDITION Request ACK) message to the eNB1, so as to notify the eNB1 that the bearer is added successfully, where the bearer addition response message includes configuration information related to DRB addition, for example, PDCP configuration information, RLC configuration information, and logical channel configuration information of the DRB. Optionally, the bearer addition response message may include an RRC connection reconfiguration message, where the RRC connection reconfiguration message includes the configuration information related to DRB addition, and indicates a base station (eNB2) associated to the DRB, for example, an identifier or index of the base station setting up the DRB with the UE is included in a fixed location or preset cell of the RRC connection reconfiguration message.

860: After receiving the bearer addition response message from the eNB2, the eNB1 generates an RRC connection reconfiguration message, and sends it to the UE. Step 860 is similar to step 730 in FIG. 7, so the details are not described herein again.

865: After receiving the RRC connection reconfiguration message, the UE performs configuration according to the related configuration information included in the RRC connection reconfiguration message, so as to add the DRB and associate the DRB to the eNB2, that is, set up the DRB with the eNB2; then, the UE sends an RRC connection reconfiguration completion message to the eNB1.

868: The eNB1 sends a bearer addition success notification message to the eNB2 for notifying that the DRB is added successfully.

Steps 870, 875, 880, 885, and 890 are similar to steps 770, 775, 780, 785, and 790 in FIG. 7, so the details are not described herein again.

In the embodiment in FIG. 8, a cell of a secondary base station is first added, and when a new service arrives, the DRB is added and is associated to the secondary base station, so as to reduce a service delay.

Figure 9:
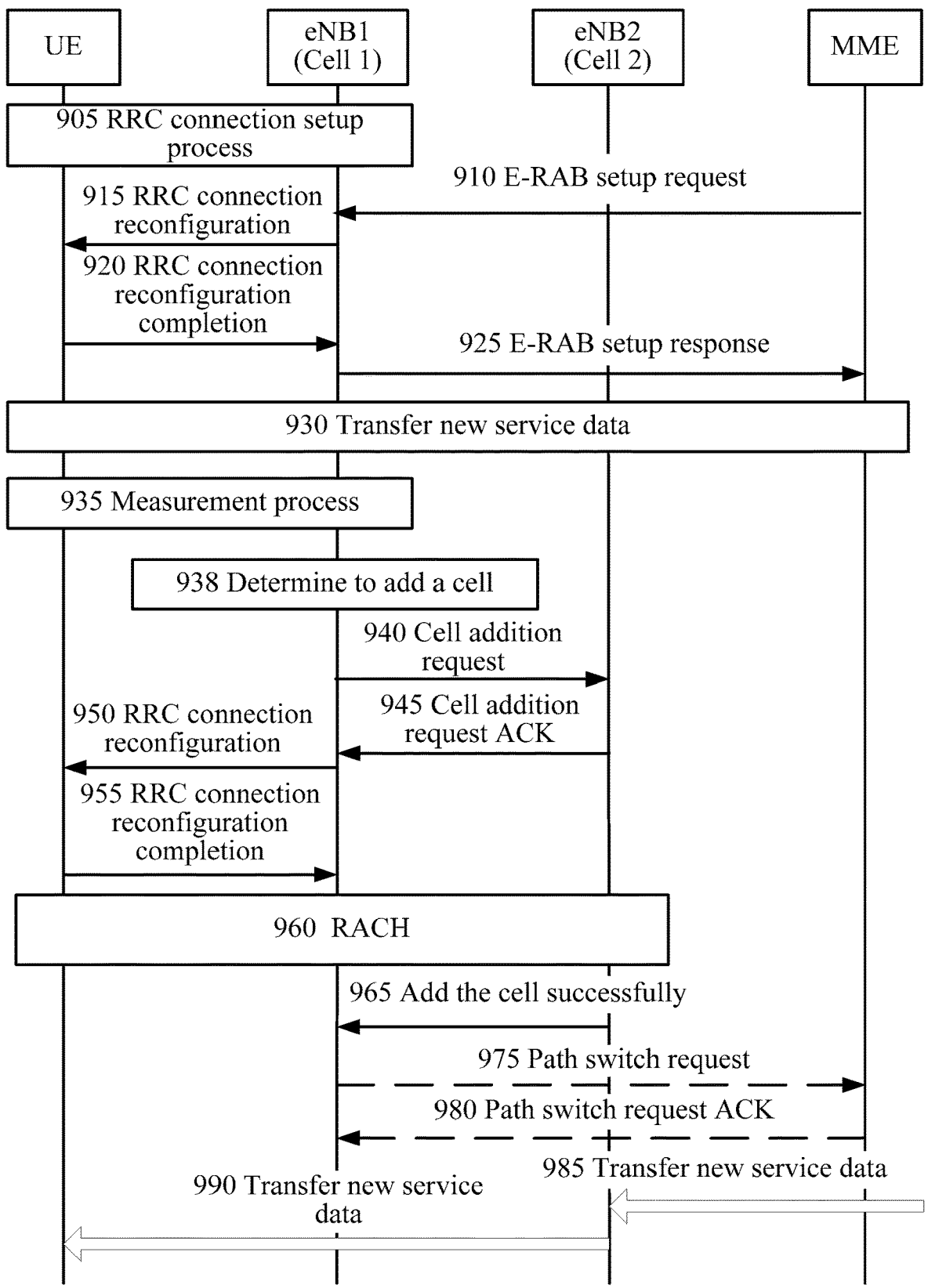
FIG. 9 is a schematic flowchart of a process of implementing carrier aggregation according to another embodiment of the present invention.

FIG. 9 is a schematic flowchart of a process of implementing carrier aggregation according to another embodiment of the present invention.

905: A UE sets up an initial RRC connection with a Cell1 of an eNB1.

910: When a new service arrives, an MME sends an S1 message, that is, an E-RAB setup request message to the eNB1 through an S1 interface, for requesting setting up a new E-RAB.

915: The eNB1 generates an RRC connection reconfiguration message, where the RRC connection reconfiguration message includes configuration information related to DRB addition and indicates a base station (eNB1) associated to a DRB, for example, an identifier or index of a base station setting up the DRB with the UE is included in a fixed location or preset cell of the RRC connection reconfiguration message; then, the eNB1 sends the RRC connection reconfiguration message to the UE.

920: The UE performs configuration according to the related configuration information included in the RRC connection reconfiguration message, so as to add the DRB and set up the DRB with the eNB1; then, the UE may send an RRC connection reconfiguration completion message to the eNB1.

925: The eNB1 sends an E-RAB setup response to the MME, so as to notify the MME that an E-RAB is set up successfully.

930: The new service may be sent to the UE by the eNB1.

935: The UE performs measurement according to a measurement control message delivered by the eNB1, so as to obtain a measurement result such as signal quality information of a neighboring cell (for example, an eNB2) of the eNB1.

938: Determine, according to a preset policy, to add a Cell2 of the eNB2 for the UE, and associate a DRB corresponding to the E-RAB to the eNB2. Optionally, the eNB1 may allocate a cell index to the Cell2. Step 938 is similar to step 718 in FIG. 7, so the details are not described herein again.

940: The eNB1 sends a cell addition request message (or called an initial context setup request message) to the eNB2 and carries a cell index and corresponding cell information (including a frequency band and a PCI of a cell), for adding the cell, and carries an ID of the DRB that is previously set up, for instructing the UE to associate the DRB to the eNB2, that is to say, change the DRB that is set up with the eNB1 to setting up the DRB with the eNB2.

945: After receiving the cell addition request message, the eNB2 may perform admission control according to the foregoing information carried in the cell addition request message, so as to determine whether to add a cell of the eNB2 for the UE and whether to add the DRB for the UE on the eNB2; then, the eNB2 may send a cell addition response message to the eNB1, where the cell addition response message may include configuration information related to cell addition. Optionally, the cell addition response message may include an RRC connection reconfiguration message, where the RRC connection reconfiguration message may include the configuration information related to cell addition and indicate a base station to which an added cell belongs, and the RRC connection reconfiguration message further includes the ID of the DRB that has been set up and an identifier or index of a new base station setting up the DRB with the UE, for instructing the UE to associate the DRB to the new base station.

950: After receiving the cell addition response message from the eNB2, the eNB1 generates an RRC connection reconfiguration message, and sends it to the UE. The RRC connection reconfiguration message includes the configuration information related to cell addition, and indicates the base station to which the added cell belongs, and the RRC connection reconfiguration message further includes the ID of the DRB that has been set up and the identifier or index of the new base station setting up the DRB with the UE, for instructing to associate the DRB to the new base station, that is to say, change the DRB from being associated to one base station to being associated to another base station. Optionally, in a situation where the cell addition response message includes the RRC connection reconfiguration message, the RRC connection reconfiguration message included in the cell addition response message may be directly sent to the UE.

955: The UE sends an RRC connection reconfiguration completion message to the eNB1.

960: The UE initiates a random access process on the new cell Cell2, so as to perform synchronization with the Cell2. The sequence of steps 955 and 960 may be reversed.

965: After the random access of the UE succeeds, the eNB2 sends a cell addition success message to the eNB1 and carries an index of the Cell2, for notifying the eNB1 that the Cell2 is added successfully.

Steps 975, 980, 985, and 990 are similar to steps 775, 780, 785, and 790 in FIG. 7 respectively, so the details are not described herein again.

In the embodiment in FIG. 9, when a new service arrives, a DRB corresponding to the new service is immediately added and associated to a primary base station, so as to first transmit data of the service on the primary base station, which leads to a fast service connection and a low delay, and then, it is obtained through measurement that the signal quality of a cell of a secondary base station is good, the cell of the secondary base station is added and the DRB is changed from being associated to the primary base station to being associated to the secondary base station.

Figure 10:
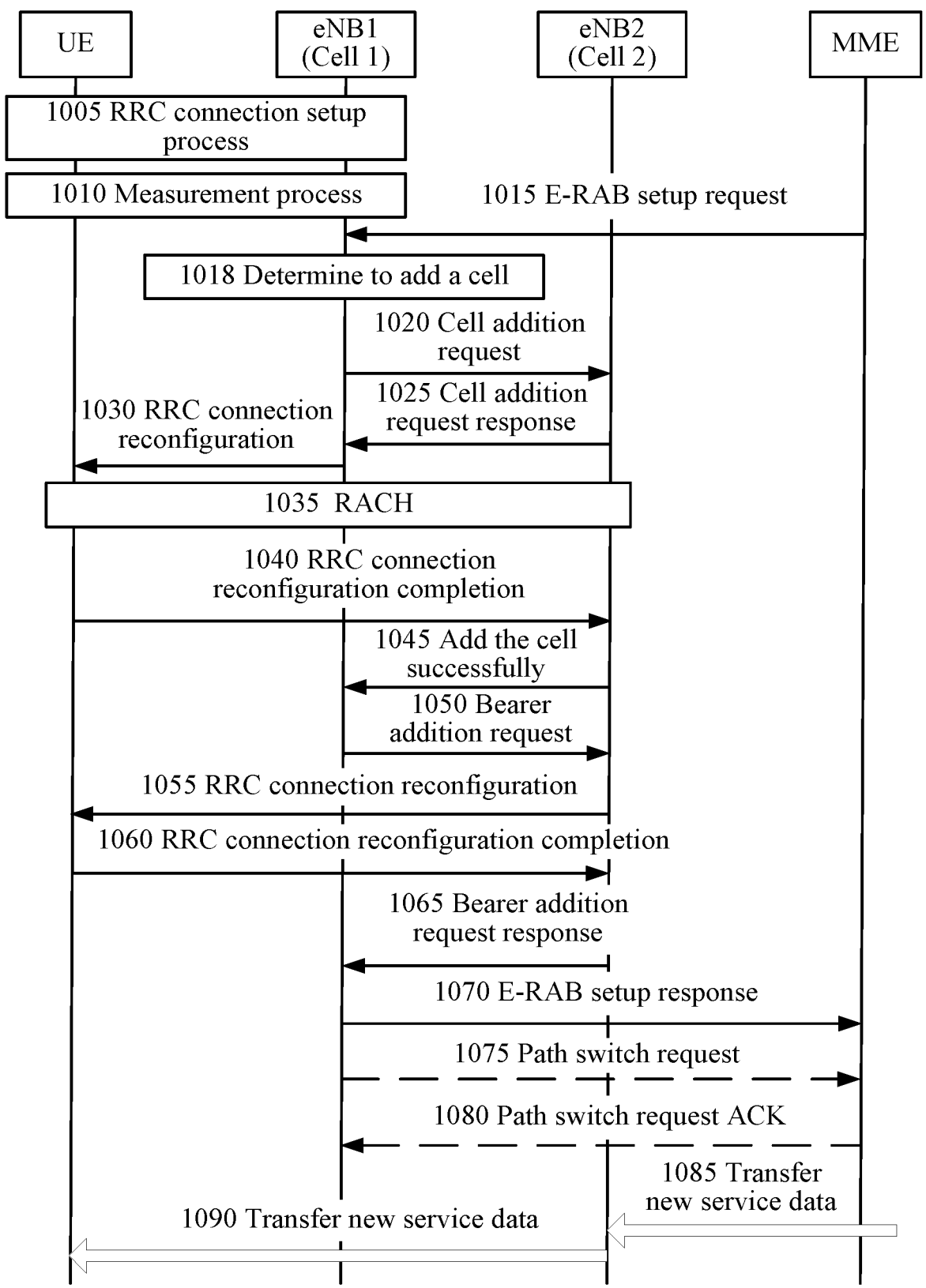
FIG. 10 is a schematic flowchart of a process of implementing carrier aggregation according to another embodiment of the present invention.

FIG. 10 is a schematic flowchart of a process of implementing carrier aggregation according to another embodiment of the present invention.

1005: A UE sets up an initial RRC connection with a Cell1 of an eNB1.

1010: The UE performs measurement according to a measurement control message delivered by the eNB1, so as to obtain a measurement result such as signal quality information of a neighboring cell (for example, an eNB2) of the eNB1.

1015: When a new service arrives, an MME sends an S1 message, that is, an E-RAB setup request message, to the eNB1 through an S1 interface, for requesting setting up a new E-RAB.

1018: After receiving the E-RAB setup request, the eNB1 determines, according to a preset policy, that a Cell2 of the eNB2 needs to be added for the UE and a bearer corresponding to an E-RAB needs to be set up on the eNB2, which is similar to step 718 in FIG. 7, so the details are not described herein again.

1020: The eNB1 sends a cell addition request message to the eNB2, which is similar to step 820 in FIG. 8, so the details are not described herein again.

1025: After receiving the cell addition request message, the eNB2 may perform admission control according to the foregoing information carried in the cell addition request message, so as to determine whether to add a cell of the eNB2 for the UE; then, the eNB2 may send a cell addition response message to the eNB1. The cell addition response message includes configuration information related to cell addition, for example, configuration information such as a frequency band and a PCI of the Cell2, antenna information of the Cell2, and a physical channel, and related configuration information of a SRB, for example, RLC configuration information and logical channel configuration information. Optionally, the cell addition response message may include an RRC connection reconfiguration message, where the RRC connection reconfiguration message includes the configuration information related to cell addition, and indicates a base station to which an added cell belongs and the related configuration information of the SRB. For example, an ID or index of a base station to which the added cell belongs may be included in a fixed location or preset cell of the RRC connection reconfiguration message, so as to indicate the base station to which the added cell belongs.

1030: After receiving the cell addition response message from the eNB2, the eNB1 generates an RRC connection reconfiguration message, and sends it to the UE. The RRC connection reconfiguration message includes the configuration information related to cell addition and the related configuration information of the SRB, and indicates the base station to which the added cell belongs. Optionally, in a situation where the cell addition response message includes the RRC connection reconfiguration message, the RRC connection reconfiguration message included in the cell addition response message may be directly sent to the UE.

1035: The UE initiates a random access process on the new cell Cell2, so as to perform synchronization with the Cell2.

1040: The UE sends an RRC connection reconfiguration completion message to the eNB2. Optionally, the sequence of steps 1035 and 1040 may be reversed.

1045: The eNB2 sends a cell addition success message to the eNB1, for notifying the eNB1 that the cell Cell2 is added successfully. Step 1045 is similar to step 845 in FIG. 8, so the details are not described herein again.

1050: The eNB1 sends a bearer addition request message, where the bearer addition request message may carry a DRB ID and a corresponding E-RAB related parameter (mainly including a QoS parameter such as a priority and a guaranteed rate), for adding a DRB.

1055: After receiving the bearer addition request message, the eNB2 may perform admission control according to the foregoing information carried in the bearer addition request message, so as to determine whether to add the DRB for the UE on the eNB2. The eNB2 may generate an RRC connection reconfiguration message, and directly send the RRC connection reconfiguration message to the UE, where the RRC connection reconfiguration message includes configuration information related to DRB addition, and indicates a base station (for example, the eNB2) associated to the DRB. Optionally, by default, a base station receiving the RRC connection reconfiguration message may be the base station to be associated.

1060: The UE sends an RRC connection reconfiguration completion message to the eNB2.

1065: The eNB2 sends a bearer addition response message, so as to notify the eNB1 that the DRB is added successfully.

Steps 1070, 1075, 1080, 1085, and 1090 are similar to steps 770, 775, 780, 785, and 790 in FIG. 7, so the details are not described herein again.

In the embodiment in FIG. 10, when a cell of a secondary base station is added, an SRB on the cell is set up at the same time, so that a base station where the cell is located is capable of directly performing signaling interaction with the UE, so as to reduce transferring of signaling.

The method for implementing carrier aggregation according to the embodiments of the present invention is described above, and a base station and a UE for implementing carrier aggregation according to the embodiments of the present invention are described in the following with reference to FIG. 11 to FIG. 16.

Figure 11:
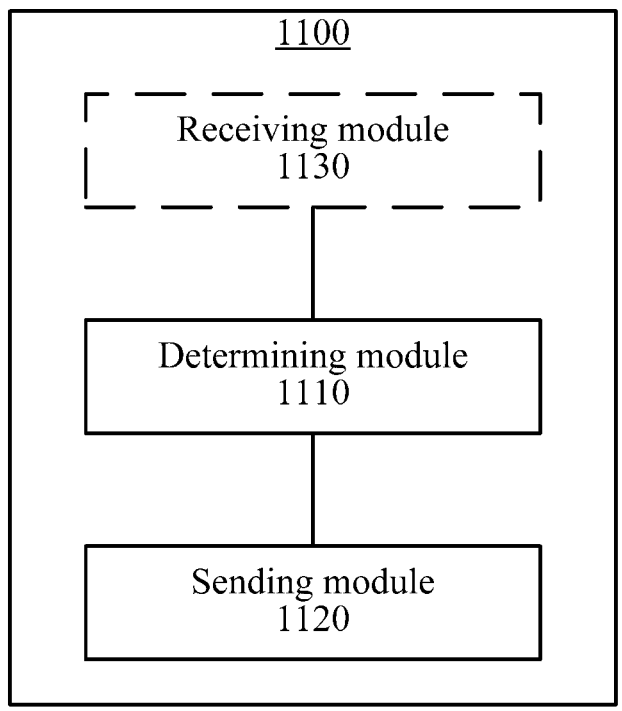
FIG. 11 is a schematic structural diagram of a base station according to an embodiment of the present invention.

FIG. 11 is a schematic structural diagram of a base station 1100 according to another embodiment of the present invention. The base station 1100 may be used as a primary base station for carrier aggregation. The base station 1100 includes a determining module 1110 and a sending module 1120.

The determining module 1110 determines to add a cell for a user equipment UE. The sending module 1120 sends a first message to the UE, where the first message is used to instruct the UE to add the cell, the first message includes configuration information of the cell and an identifier or index of a base station to which the cell belongs, and the base station to which the cell belongs is a secondary base station.

In the embodiment of the present invention, under the control of the primary base station of the UE, a cell of another base station can be added for the UE, so as to implement the carrier aggregation, thereby further increasing the user throughput of the UE.

Optionally, in another embodiment, before sending the first message to the UE, the sending module 1120 further sends a second message to the secondary base station, where the second message is used to request the secondary base station to add the cell for the UE and includes an identifier of the cell. The base station further includes a receiving module 1130. The receiving module 1130 receives a third message from the secondary base station, where the third message is used to respond to the second message and includes the configuration information of the cell.

Optionally, in another embodiment, the second message is further used to request the secondary base station to add a DRB for the UE, and the second message further includes an identifier of the DRB and configuration information of an evolved radio access bearer E-RAB corresponding to the DRB.

Optionally, in another embodiment, the first message is further used to instruct the UE to add the DRB and associate the DRB to the secondary base station, and the first message further includes configuration information of the DRB, the identifier of the DRB, and the identifier or index of the base station to which the DRB is associated. Optionally, in another embodiment, the sending module 1120 further sends a fifth message to the UE, for instructing the UE to add the DRB and associate the DRB to the secondary base station, where the fifth message includes the configuration information of the DRB, the identifier of the DRB, and the identifier or index of the base station to which the DRB is associated.

Optionally, in another embodiment, before sending the fifth message to the UE, the sending module 1120 sends a sixth message to the secondary base station, for requesting the secondary base station to add the DRB for the UE, where the sixth message includes the identifier of the DRB and the configuration information of the E-RAB corresponding to the DRB; and the sending module 1120 receives and bears a seventh message from the secondary base station, for responding to the sixth message, where the seventh message includes the configuration information of the DRB.

Optionally, in another embodiment, the first message is further used to instruct the UE to set up a signaling radio bearer SRB with the secondary base station to, and the third message and the first message further include configuration information of the SRB.

Optionally, in another embodiment, the first message is further used to instruct the UE to change the DRB from being associated to one base station to being associated to another base station, and the first message includes the identifier of the DRB and an identifier or index of the another base station to which the DRB is associated.

Optionally, in another embodiment, the base station 1100 receives a fourth message from the secondary base station, for learning that the cell is added successfully, where the fourth message includes an index of the cell of the secondary base station, and the index of the cell of the secondary base station is allocated by the base station 1100 and is included in the second message.

Optionally, in another embodiment, the base station 1100 sends an identifier of the E-RAB and path information of the secondary base station to a mobility management entity, so as to request the mobility management entity to instruct a serving gateway to send data of the E-RAB to the secondary base station; or, the base station 1100 forwards, to the secondary base station, the data of the E-RAB that is received from the serving gateway.

For operations and functions of the units of the base station 1100, reference may be made to the method embodiment in FIG. 1, so the details are not described herein again to avoid repetition.

Figure 12:
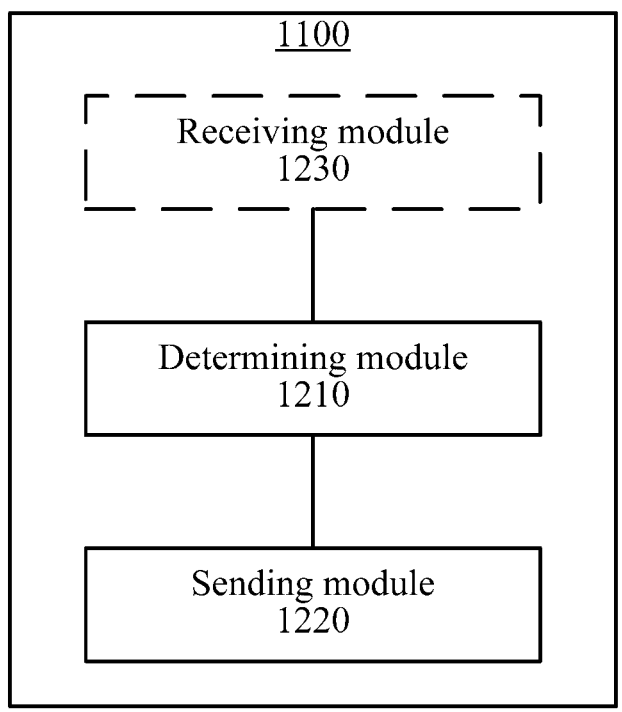
FIG. 12 is a schematic structural diagram of a base station according to another embodiment of the present invention.

FIG. 12 is a schematic structural diagram of a base station 1200 according to another embodiment of the present invention. The base station 1200 may be used as a primary base station for carrier aggregation. The base station 1200 includes a determining module 1210 and a sending module 1220.

The determining module 1210 determines to add a DRB for a UE. The sending module 1220 sends a fifth message to the UE, for instructing the UE to add the DRB and associate the DRB to a secondary base station, where the fifth message includes configuration information of the DRB, an identifier of the DRB, and an identifier or index of the base station to which the DRB is associated; and the base station to which the DRB is associated is the secondary base station.

In the embodiment of the present invention, under the control of the primary base station of the UE, a DRB on another base station can be added for the UE, so as to implement the carrier aggregation, thereby further increasing the user throughput of the UE.

Optionally, in another embodiment, before sending the fifth message to the UE, the sending module 1220 further sends a sixth message to the secondary base station, for requesting the secondary base station to add the DRB for the UE, where the sixth message includes the identifier of the DRB and configuration information of an evolved radio access bearer E-RAB corresponding to the DRB. The base station further includes a receiving module 1230. The receiving module 1230 receives a seventh message from the secondary base station for responding to the sixth message, where the seventh message includes the configuration information of the DRB.

Optionally, in another embodiment, the base station 1100 sends an identifier of the E-RAB and path information of the secondary base station to an MME, so as to request the MME to instruct a serving gateway to send data of the E-RAB to the secondary base station; or, the base station 1100 forwards, to the secondary base station, the data of the E-RAB that is received from the serving gateway.

For operations and functions of the units of the base station 1200, reference may be made to the method embodiment in FIG. 2, so the details are not described herein again to avoid repetition.

Figure 13:
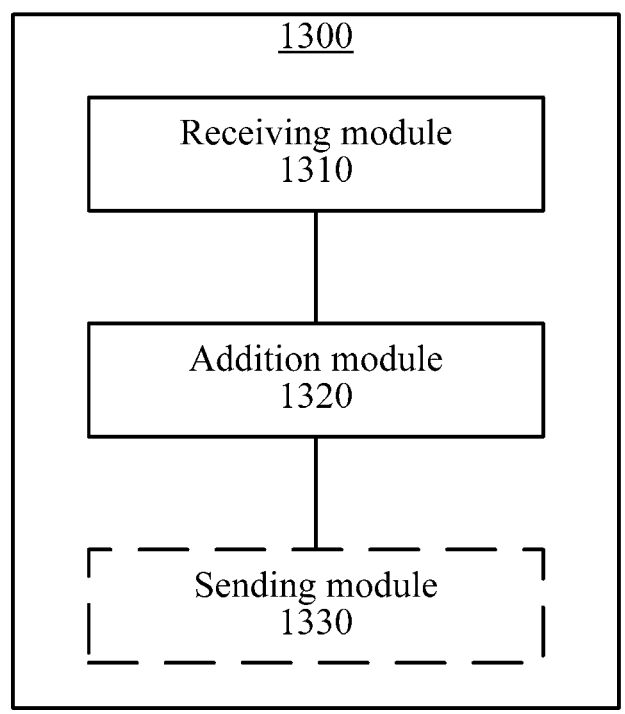
FIG. 13 is a schematic structural diagram of a base station according to another embodiment of the present invention.

FIG. 13 is a schematic structural diagram of a base station 1300 according to another embodiment of the present invention. The base station 1300 may be used as a secondary base station of a UE. The base station includes a receiving module 1310 and an addition module 1320.

The receiving module 1310 receives a second message from a primary base station, where the second message is used to request the base station to add a cell of the base station for a user equipment UE, and the second message includes an identifier of the cell of the base station. The addition module 1320 adds the cell of the base station for the UE according to the second message.

In the embodiment of the present invention, under the control of the primary base station of the UE, a cell of another base station can be added for the UE, so as to implement carrier aggregation, thereby further increasing the user throughput of the UE.

Optionally, in another embodiment, the base station further includes a sending module 1330. The sending module 1330 sends a third message to the primary base station, where the third message is used to respond to the second message and includes configuration information of the cell of the base station.

Optionally, in another embodiment, the second message is further used to request the base station to add a data radio bearer DRB for the UE, and the second message further includes an identifier of the DRB and configuration information of an evolved radio access bearer E-RAB corresponding to the DRB. The addition module 1320 is further configured to add the DRB for the UE according to the second message.

Optionally, in another embodiment, the third message further includes configuration information of a signaling radio bearer SRB.

Optionally, in another embodiment, the sending module 1330 further sends a fourth message to the primary base station for notifying the primary base station that the cell is added successfully, where the fourth message includes an index of the cell of the base station, and the index of the cell of the base station is allocated by the primary base station and is included in the second message.

For operations and functions of the units of the base station 1300, reference may be made to the method embodiment in FIG. 3, so the details are not described herein again to avoid repetition.

Figure 14:
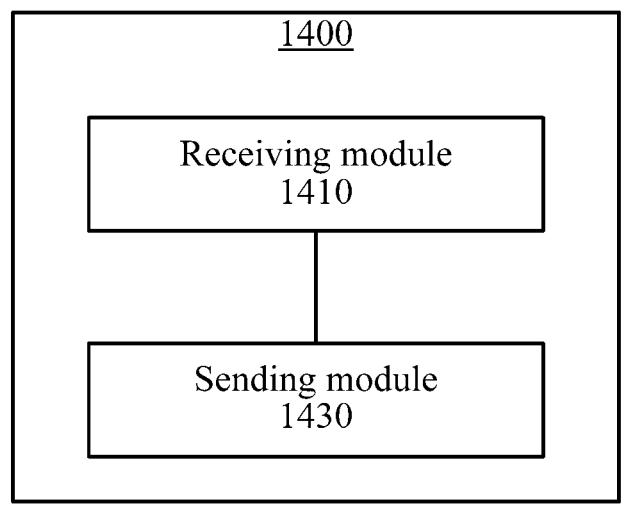
FIG. 14 is a schematic structural diagram of a base station according to another embodiment of the present invention.

FIG. 14 is a schematic structural diagram of a base station 1400 according to another embodiment of the present invention. The base station may be used as a secondary base station for carrier aggregation. The base station 1400 includes a receiving module 1410 and a sending module 1420.

The receiving module 1410 receives a sixth message from a primary base station, where the sixth message is used to request the base station 1400 to add a DRB for a UE and includes an identifier of the DRB and configuration information of an E-RAB corresponding to the DRB. The sending module 1420 sends a seventh message to the primary base station, where the seventh message is used to respond to the sixth message and includes configuration information of the DRB In the embodiment of the present invention, under the control of the primary base station of the UE, a DRB on another base station can be added for the UE, so as to implement the carrier aggregation, thereby further increasing the user throughput of the UE.

For operations and functions of the units of the base station 1400, reference may be made to the method embodiment in FIG. 4, so the details are not described herein again to avoid repetition.

Figure 15:
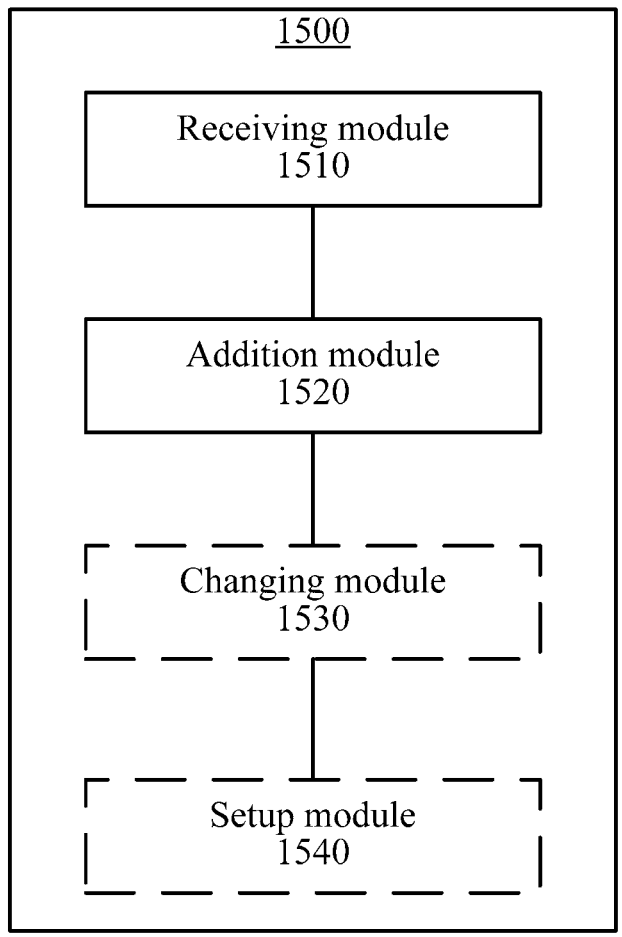
FIG. 15 is a schematic structural diagram of a UE according to an embodiment of the present invention.

FIG. 15 is a schematic structural diagram of a UE 1500 according to another embodiment of the present invention. The UE 1500 includes a receiving module 1510 and an addition module 1520.

The receiving module 1510 receives a first message from a primary base station, where the first message is used to instruct the UE to add a cell, the first message includes configuration information of the cell and an identifier or index of a base station to which the cell belongs, and the base station to which the cell belongs is a secondary base station. The addition module 1520 adds a cell of the secondary base station according to the first message.

In the embodiment of the present invention, under the control of the primary base station of the UE, a cell of another base station can be added for the UE, so as to implement carrier aggregation, thereby further increasing the user throughput of the UE.

Optionally, in another embodiment, the first message is further used to instruct the UE to add a data radio bearer DRB and associate the DRB to the secondary base station, and the first message further includes an identifier of the DRB, configuration information of the DRB, and the identifier or index of the base station to which the DRB is associated. The addition module 1520 is further configured to add the DRB and associate the DRB to the secondary base station according to the first message.

Optionally, in another embodiment, the receiving module 1510 receives a fifth message from the primary base station, where the fifth message is used to instruct the UE to add the DRB and associate the DRB to the secondary base station, and the fifth message includes the configuration information of the DRB, the identifier of the DRB, and an identifier or index of a secondary base station setting up the DRB with the UE. The addition module 1520 adds the DRB and associates the DRB to the secondary base station according to the fifth message.

According to another embodiment of the present invention, the first message is further used to instruct the UE to change the DRB from being associated to one base station to being associated to another base station, and the first message includes the identifier of the DRB and the identifier or index of the base station to which the DRB is associated. The UE further includes: a changing module 1530, configured to change the DRB from being associated to one base station to being associated to another base station.

According to another embodiment of the present invention, the first message is further used to instruct the UE to set up a signaling radio bearer SRB with the secondary base station, and the first message further includes configuration information of the SRB. The UE further includes: a setup module 1540, configured to set up the SRB with the secondary base station according to the first message.

For operations and functions of the units of the UE 1500, reference may be made to the method embodiment in FIG. 5, so the details are not described herein again to avoid repetition.

Figure 16:
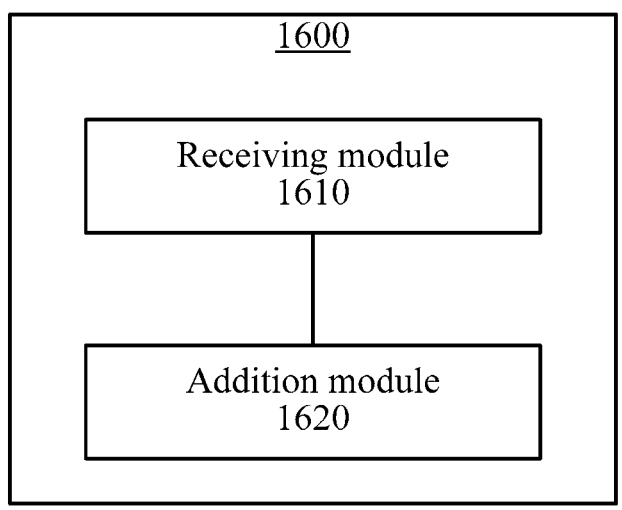
FIG. 16 is a schematic structural diagram of a UE according to another embodiment of the present invention.

FIG. 16 is a schematic structural diagram of a UE 1600 according to another embodiment of the present invention. The UE 1600 includes a receiving module 1610 and an addition module 1620.

The receiving module 1610 receives a fifth message from a primary base station, where the fifth message is used to instruct the UE to add a data radio bearer DRB and associate the DRB to a secondary base station, and the fifth message includes configuration information of the DRB, an identifier of the DRB, an identifier or index of the base station to which the DRB is associated. The addition module 1620 adds the DRB and associates the DRB to the secondary base station according to the fifth message.

In the embodiment of the present invention, under the control of the primary base station of the UE, an SRB on another base station can be added for the UE, so as to implement carrier aggregation, thereby further increasing the user throughput of the UE.

According to another embodiment of the present invention, the receiving module 1610 receives data of the DRB from the secondary base station; or sends data of the DRB to the secondary base station.

For operations and functions of the units of the UE 1600, reference may be made to the method embodiment in FIG. 6, so the details are not described herein again to avoid repetition.

Figure 17:
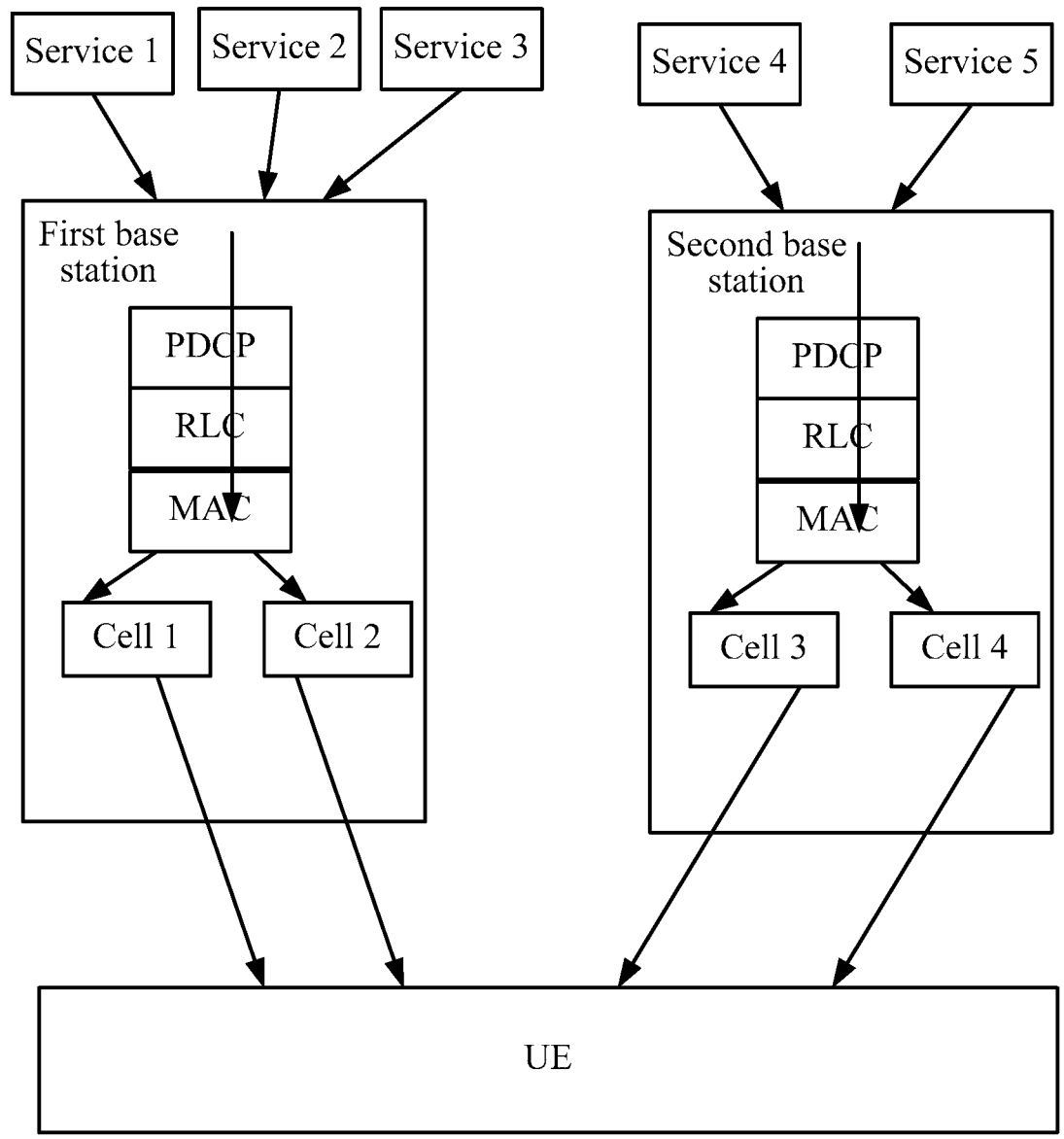
FIG. 17 is a schematic architecture diagram of a system according to an embodiment of the present invention.

FIG. 17 is a schematic architecture diagram of a system according to an embodiment of the present invention.

An embodiment of the present invention provides a communication system, which includes a UE 1710, a base station 1720, and a base station 1730. The UE 1710 may be the UE 1500 in FIG. 15 or the UE 1600 in FIG. 16. The base station 1720 may be the base station 1100 in FIG. 11 or the base station 1200 in FIG. 12. The base station 1730 may be the base station 1300 in FIG. 13 or the base station 1400 in FIG. 14.

According to the embodiment of the present invention, a data partition solution based on a service (bearer) may be adopted between base stations. Specifically, a service is associated to a base station, and if a service (or an E-RAB or an RB (Radio bearer, radio bearer)) is associated to a base station, related data of the service (E-RAB or RB) is transmitted through the base station. Referring to FIG. 17, a service 1, a service 2, and a service 3 pass through a PDCP (Packet Data Convergence Protocol, packet data convergence protocol) layer, an RLC (Radio Link Control, radio link control) layer, and a MAC (Media Access Control, media access control) layer of the base station 1720, and are transferred through a cell 1 and a cell 2, while a service 4 and a service 5 pass through a PDCP layer, an RLC layer, and a MAC layer of the base station 1730, and are transferred through a cell 3 and a cell 4. According to the embodiment of the present invention, an underlying aggregation solution which is the same as the Release-10 version of 3GPP may be adopted in the base station.

Persons of ordinary skill in the art may appreciate that, with reference to the examples described in the embodiments disclosed herein, units and algorithm steps can be implemented by electronic hardware, or a combination of computer software and electronic hardware. Whether the functions are executed by hardware or software depends on particular applications and design constraint conditions of the technical solutions. Persons skilled in the art may use different methods to implement the described functions for each particular application, and such implementation shall be construed as falling within the scope of the present invention.

It may be clearly understood by persons skilled in the art that, for the purpose of convenient and brief description, reference may be made to the corresponding process in the method embodiments for a specific working process of the foregoing systems, apparatuses, and units, so the details are not described herein again.

In the several embodiments provided in the present application, it should be understood that, the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanic, or other forms.

The units described as separate parts may be or may not be physically separate, and parts displayed as units may be or may not be physical units, which may be located in one location, or may be distributed on multiple network elements. A part or all of the units may be selected according to actual needs to achieve the objectives of the solutions of the embodiments.

In addition, various functional units according to each embodiment of the present invention may be integrated in one processing unit or may physically exist as separate units, or two or more units may also be integrated in one unit.

If the function is implemented in a form of a software functional unit and sold and used as an independent product, the function may be stored in a computer readable storage medium. Based on such understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device) to perform all or a part of the steps of the method described in the embodiments of the present invention. The storage medium includes any medium that can store program codes, such as a USB flash drive, a mobile hard disk, a read-only memory (ROM, Read-only Memory), a random access memory (RAM, Random Access Memory), a magnetic disk, or an optical disk.

The foregoing description is merely specific embodiments of the present invention, but is not intended to limit the protection scope of the present invention. Any variations or replacements made by persons skilled in the art within the technical scope of the present invention shall fall within the protection scope of the present invention. Therefore, the scope of the present invention shall be subject to the appended claims.

What is claimed is:

1. An apparatus, comprising:
    a memory storing instructions; and
    at least one processor in communication with the memory, the at least one processor executing the instructions to:
        communicate, with a primary base station via a data radio bearer (DRB);
        receive a radio resource control (RRC) connection reconfiguration message from the primary base station, the RRC connection reconfiguration message instructing the apparatus to add a cell of a secondary base station and associate the DRB with the cell of the secondary base station, wherein the RRC connection reconfiguration message comprises an identifier of the DRB and configuration information of the cell;
        change association with the DRB from the primary base station to the secondary base station;
        send a RRC connection reconfiguration completion message to the primary base station; and
        communicate with the secondary base station via the DRB during carrier aggregation.

2. The apparatus according to claim 1, wherein the at least one processor further executes the instructions to:
    associate the DRB with the cell of the secondary base station.

3. The apparatus according to claim 2, wherein the at least one processor further executes the instructions to:
    communicate data carried on the DRB with the secondary base station.

4. The apparatus according to claim 1, wherein the at least one processor further executes the instructions to:
    obtain information of a signaling radio bearer (SRB) from the primary base station; and
    exchange signaling with the secondary base station via the SRB.

5. The apparatus according to claim 1, wherein the at least one processor further executes the instructions to:
    obtain an identifier or index of the secondary base station.

6. A method, comprising:
    communicating, by an apparatus, with a primary base station via a data radio bearer (DRB);
    receiving, by the apparatus, a radio resource control (RRC) connection reconfiguration message from the primary base station, the RRC connection reconfiguration message instructing to add a cell of a secondary base station and associate the DRB with the cell of the secondary base station, wherein the RRC connection reconfiguration message comprises an identifier of the DRB and configuration information of the cell;
    changing, by the apparatus, association with the DRB from the primary base station to the secondary base station;
    sending, by the apparatus, a RRC connection reconfiguration completion message to the primary base station; and
    communicating, by the apparatus, with the secondary base station via the DRB during carrier aggregation.

7. The method according to claim 6, further comprising:
    associating, by the apparatus, the DRB with the cell of the secondary base station.

8. The method according to claim 7, further comprising:
    communicating, by the apparatus, data carried on the DRB with the secondary base station.

9. The method according to claim 6, further comprising:
    obtaining, by the apparatus, information of a signaling radio bearer (SRB) from the primary base station; and
    exchanging, by the apparatus, signaling with the secondary base station via the SRB.

10. The method according to claim 6, further comprising:
    obtaining, by the apparatus, an identifier or index of the secondary base station.

11. The method according to claim 6, wherein the identifier of the DRB is further comprised in a cell addition request from the primary base station to the secondary base station, the cell addition request requests the secondary base station to add the cell and change association with the DRB from the primary base station to the secondary base station for the apparatus.

12. The method according to claim 11, wherein the cell addition request further comprises configuration information of an evolved radio access bearer E-RAB corresponding to the DRB.

13. A method, comprising:
    communicating, by a primary base station, with a terminal via a data radio bearer (DRB);
    sending, by the primary base station, a cell addition request to a secondary base station, the cell addition request requesting the secondary base station to add a cell of the secondary base station and change association with the DRB from the primary base station to the secondary base station for the terminal, wherein the cell addition request comprises an identifier of the DRB;
    sending, by the primary base station, a radio resource control (RRC) connection reconfiguration message to the terminal, the RRC connection reconfiguration message instructing the terminal to add the cell of a secondary base station and associate the DRB with the cell of the secondary base station, wherein the RRC connection reconfiguration message comprises the identifier of the DRB and configuration information of the cell; and
    receiving, by the primary base station, a RRC connection reconfiguration completion message from the terminal.

14. The method according to claim 13, wherein the cell addition request further comprises configuration information of an evolved radio access bearer E-RAB corresponding to the DRB.

15. The method according to claim 14, further comprising:
sending, by the primary base station, an identity of the E-RAB and path information of the secondary base station to a core network device; and
receiving, by the primary base station, configuration information of the cell from the secondary base station.

16. A primary base station, comprising:
a memory storing instructions; and
at least one processor in communication with the memory, the at least one processor executing the instructions to:
communicate with a terminal via a data radio bearer (DRB);
send a cell addition request to a secondary base station, the cell addition request requesting the secondary base station to add a cell of the secondary base station and change association with the DRB from the primary base station to the secondary base station for the terminal, wherein the cell addition request comprises an identifier of the DRB;
send a radio resource control (RRC) connection reconfiguration message to the terminal, the RRC connection reconfiguration message instructing the terminal to add the cell of the secondary base station and associate the DRB with the cell of the secondary base station, wherein the RRC connection reconfiguration message comprises the identifier of the DRB and configuration information of the cell; and
receive a RRC connection reconfiguration completion message from the terminal.

17. The primary base station according to claim 16, wherein the cell addition request further comprises configuration information of an evolved radio access bearer E-RAB corresponding to the DRB.

18. The primary base station according to claim 17, wherein the at least one processor further executes the instructions to:
send an identity of the E-RAB and path information of the secondary base station to a core network device; and
receive configuration information of the cell from the secondary base station.

\* \* \* \* \*